United States Patent [19]
Kurosawa et al.

[11] Patent Number: 6,047,288
[45] Date of Patent: Apr. 4, 2000

[54] GROUP ENVIRONMENT SETTING METHOD AND SYSTEM THEREOF TO PROVIDE AN EQUIVALENT ENVIRONMENT FOR PLURAL PARTICIPANTS

[75] Inventors: Takahiro Kurosawa, Kunitachi; Hiroaki Sato, Kawasaki, both of Japan

[73] Assignee: Canon Kabushiki Kaisha, Tokyo, Japan

[21] Appl. No.: 08/683,950

[22] Filed: Jul. 19, 1996

[30] Foreign Application Priority Data

Jul. 20, 1995 [JP] Japan .................................... 7-184199
Jan. 18, 1996 [JP] Japan .................................... 8-006549

[51] Int. Cl.$^7$ .................................................... G06F 12/14
[52] U.S. Cl. ..................................... 707/9; 707/8; 707/10; 395/200.47; 395/200.55; 395/200.58; 395/200.59
[58] Field of Search ............... 707/8, 9, 10; 395/187.01, 395/200.44, 200.55, 200.58, 200.59, 200.47; 711/163; 380/25

[56] References Cited

U.S. PATENT DOCUMENTS

| | | | |
|---|---|---|---|
| 4,713,753 | 12/1987 | Boebert et al. .......................... | 711/164 |
| 5,173,939 | 12/1992 | Abadi et al. .............................. | 380/25 |
| 5,220,604 | 6/1993 | Gasser et al. ............................. | 380/23 |
| 5,321,841 | 6/1994 | East et al. ................................ | 395/641 |
| 5,335,346 | 8/1994 | Fabbio .................................... | 711/163 |
| 5,475,819 | 12/1995 | Miller et al. ....................... | 395/200.33 |
| 5,495,412 | 2/1996 | Thiesen ...................................... | 705/1 |
| 5,511,187 | 4/1996 | Cragun ....................................... | 707/8 |
| 5,539,906 | 7/1996 | Abraham et al. ........................... | 707/9 |
| 5,587,935 | 12/1996 | Brooks et al. ........................... | 364/578 |
| 5,675,745 | 10/1997 | Oku et al. ................................ | 395/207 |
| 5,689,708 | 11/1997 | Regnier et al. ......................... | 395/682 |
| 5,692,141 | 11/1997 | Kamisango et al. ..................... | 345/329 |
| 5,764,890 | 6/1998 | Glasser et al. ............................. | 380/25 |

OTHER PUBLICATIONS

Webber, G. E., "Multiple levels are key to security in open environments", Communications News, vol. 29, No. 5, Abstract Only, May 1992.

Proc. Symp. User Interface Software and Technol. (UIST), Nov. 11, 1991, No. Symp. 4, Assoc. For Computing Mechinery, pp. 69–78, Dewan et al., "Primitives For Programming Multi–User Interfaces".

Sharing Perspectives, Oct. 31, 1992, Shen et al., pp. 51–58, "Access Control For Collaborative Environments".

*Primary Examiner*—Jean R. Homere
*Attorney, Agent, or Firm*—Fitzpatrick, Cella, Harper & Scinto

[57] ABSTRACT

The present invention relates to a group environment setting method in a system where plural participants form a group and perform a cooperative operation. Environment setting information for an application environment setting of a cooperative operation is registered in a group unit. When a group is designated by a participant, environment setting information corresponding to the designated group is read from the registered environment setting information, and applied as environment setting information of the participant. A data structure of the environment setting information has a hierarchical structure, and information related to the designated environment setting items is selected from the read environment setting information.

55 Claims, 24 Drawing Sheets

| IDENTIFIER | COOPERATIVE OPERATION GROUP |
|---|---|
| # 3005 | ENVIRONMENT IMPROVEMENT COMMITTEE |
| # 3200 | COMPUTER FUNDAMENTAL RESEARCH GROUP |
| # 3213 | UI RESEARCH GROUP REGULAR MEETING |
| # 6701 | COOPERATIVE DEVELOPMENT #1 |
| # 8025 | PATENT DISCUSSION #5 |

104a

| 401a |
|---|
| # 3213 |
| UI RESEARCH GROUP REGULAR MEETING |
| PARENT GROUP (REGULAR MEETING) |
| CHILD GROUP (NOT AVAILABLE) |
| ENVIRONMENT SETTING INFORMATION |
|    PUBLIC |
|    PRIVATE |
| # 3000 |
| REGULAR MEETING |
| PARENT GROUP (OPERATION IN RESEARCH CENTER) |
| CHILD GROUP (ENVIRONMENT, COMPUTER, UI) |
| ENVIRONMENT SETTING INFORMATION |
|    PUBLIC |
|    PRIVATE |

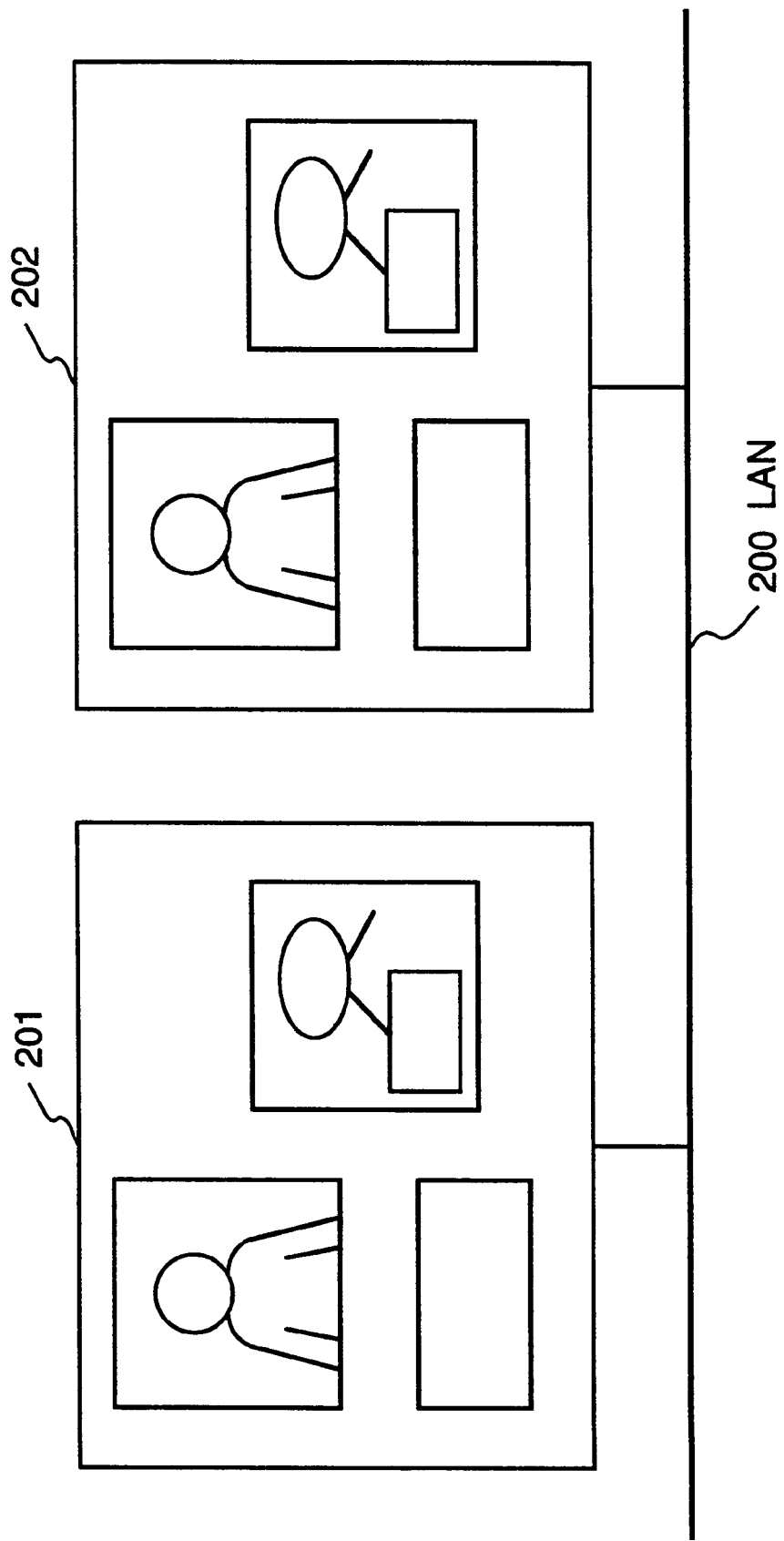

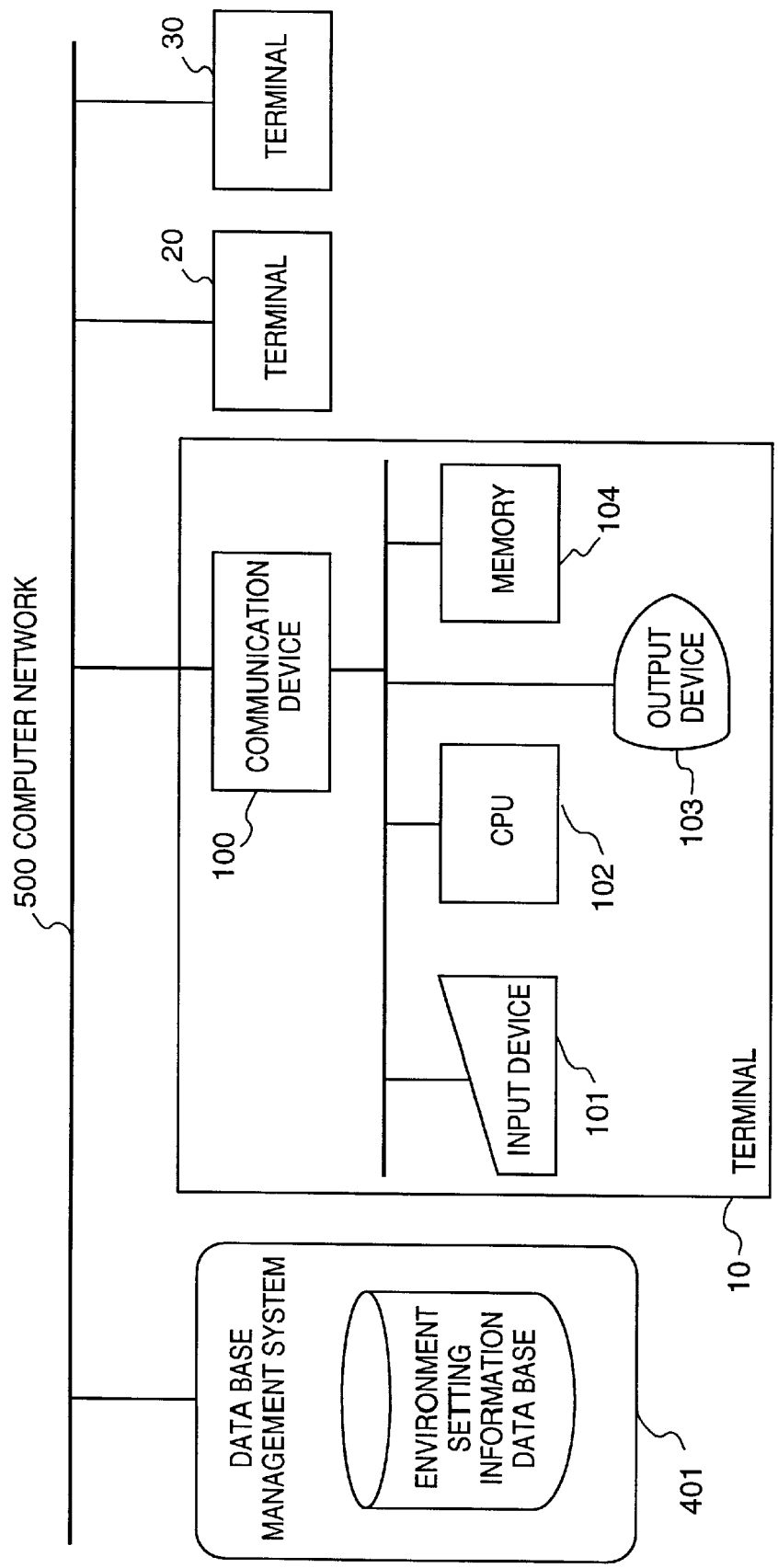

3213
UI RESEARCH GROUP REGULAR MEETING
PARENT GROUP (REGULAR MEETING)
CHILD GROUP (NOT AVAILABLE)
ENVIRONMENT SETTING INFORMATION
  PUBLIC
  PRIVATE
3000
REGULAR MEETING
PARENT GROUP (OPERATION IN RESEARCH CENTER)
CHILD GROUP (ENVIRONMENT, COMPUTER, UI)
ENVIRONMENT SETTING INFORMATION
  PUBLIC
  PRIVATE

| IDENTIFIER | COOPERATIVE OPERATION GROUP |
|---|---|
| #3005 | ENVIRONMENT IMPROVEMENT COMMITTEE |
| #3200 | COMPUTER FUNDAMENTAL RESEARCH GROUP |
| #3213 | UI RESEARCH GROUP REGULAR MEETING |
| #6701 | COOPERATIVE DEVELOPMENT #1 |
| #8025 | PATENT DISCUSSION #5 |
| .... | .... |

| Gr. | Gr.NAME | USER1 | USER2 | USER3 | USER4 |
|---|---|---|---|---|---|
| 1 | A | ○ | ○ | ○ | × |
| 2 | B | ○ | × | × | ○ |
| 3 | C | × | ○ | ○ | × |
| ⋮ | | | | | |

| Room | Gr. | UserClass | Read/Peep | Write/Join | Meta-Write | FloorPolicy |
|---|---|---|---|---|---|---|
| A201 | 11 | Chair/Own | Good | Good | Good | Automatic |
| A202 | 11 | Member | | | | |
| ⋮ | | Manager | | | | |
| ⋮ | | Collegue | | | | |
| | | World | | | | |
| | | ⋮ | | | | |

| CAMERA | PLACE |
|---|---|
| CM001 | A201 |
| CM002 | H201 |
| ------ | ----- |

GROUP ENVIRONMENT SETTING METHOD AND SYSTEM THEREOF TO PROVIDE AN EQUIVALENT ENVIRONMENT FOR PLURAL PARTICIPANTS

BACKGROUND OF THE INVENTION

Present invention relates to a group environment setting method and system thereof for setting an operation environment and an application software for a group of people when a cooperative operation is performed on a computer by a group consisting of plural persons.

In the conventional computer environment setting, customization of an application environment and various software are performed on individual basis. Personal customization of a layout of metaphors on a desktop of GUI (Graphical User Interface), or setting of key binding on a personal-use software or the like can be given as examples. In order to achieve such environment setting, each customization information is managed by storing the information in files or the like on individual basis. Even in a case where similar customized setting can be applied for a same operation, or can be shared in a same department of a company, the files are redundantly stored by each person.

Meanwhile, as one of the techniques for organizing complicated program information, an inheriting function is conventionally suggested, where program information such as an operation method and data structure or the like is managed in hierarchy, and where information defined in the upper hierarchy is inherited by the lower hierarchy. Taking the program language C++ as an example, when classes are defined as a template of an object, the inheriting function is employed to hierarchize the classes so that the complicated classes are simply defined.

Recently, as the high-performance computers, connected with each other in a high-speed network, are widely used and technologies for distributed computing softwares are developed, enabling a group consisting of plural persons to parallelly perform a cooperative operation, it has become necessary to develop a tool which is suitable for setting an operation environment and an application software for each of such groups.

In the conventional method of setting an environment on individual basis, however, since each environment is set separately, enough supports cannot be provided for users in a cooperative operation environment, resulting in the following problems:

(1) Labor required for setting an environment cannot be reduced even among those people who participate in the same cooperative operation;
(2) Even among members who belong to the same group, an operation method in one's environment is completely different from an operation method in another environment;
(3) It is difficult to maintain consistency in an environment setting of each persons in a group;
(4) It is difficult to support a dynamically generated group. Herein, the dynamically generated group is not a group having a predetermined identifier, but is a group not having a specific identifier, for instance, a group of terminals which run a predetermined application software;
(5) A flexible way of specifying a group is not provided.

In order to solve the above problems, a method is sought for setting a common environment in a group consisting of plural persons.

Recently, a network application is not limited to sharing of information via files or database, but is extended to a wider application form, such as a video conference or viewing of remote camera images. FIG. 1 shows a typical operation environment, where plural workstations or personal computers 201 and 202 are connected via a LAN 200 and holding of a television conference as well as sharing of drawing tools are possible by sending information to each other through the network such as the LAN.

Due to the aforementioned development in network application form, it is necessary to extend an idea of an environment to be set for programs operated via network. The primary factor for setting an environment herein is, for instance, setting of an access privilege (file protection code) related to data to be generated, setting of privacy protection in video conferences (i.e. allowance of limited attendants), setting of rules for assigning a chairperson privilege or an operation privilege in a cooperative operation tool and the like.

With the conventional method of setting an environment on individual basis, there are the following problems in the cooperative operation environment.

(1) Since an environment setting is non-dynamical, it is troublesome to change the setting in accordance with a group situation;
(2) Since no specific display of the group situation is explicitly made, confusion occurs among persons who belong to the same group but operate in different environment settings.

When operation behavior of a concerned party is observed in a real world from a cooperative-operation point of view, a style or a rule for individual operation behavior does not solely depend on data which is subjected to operation, or members who constitute the group, but mostly depends on the situation where a group activity is carried on. However, the above described group situation is not applied to present computer-base cooperative operation system (groupware). And it has not been realized to execute the group operation effectively.

As such words like cyberspace or media space are suggested to describe an information world constituted by networked computers, a network is accessed with an assumption of a space as a metaphor. Therefore, an expression of the above group situation as a "place" to execute a certain operation, can be regarded as an analogy of a space. A directory as in a set of files, for instance, can be the "place" in the current computer system. However, information in the directory has protection code for the directory only; and there is no method for sharing the protection code in a group, for example, when generating a new file in the same group.

SUMMARY OF THE INVENTION

The present invention has been made in consideration of the above situation, and has as its object to provide a group environment setting method and system thereof which can easily set group operation environment and application software, when a cooperative operation is performed on a computer by a group consisting of plural persons. More particularly, the object of the present invention is to provide a group environment setting method and system thereof which enables sharing of environment setting information by a group unit by utilizing a database and the like, and enables easy group identification.

It is another object of the present invention to provide a group environment setting method and system thereof which can easily set an operation environment, not only in a commonly-used cooperative operation environment using computers, but also in an exclusive cooperative operation environment (such as a television conference system) which utilizes a specific apparatus.

It is another object of the present invention to provide a group environment setting method and system thereof which effectively realize privacy protection for a group operation or among individuals in a certain group, by extending the idea of a "place" to describe a group situation and by explicitly identifying and applying existing rules, conditions or agreements.

It is another object of the present invention to provide an environment setting method and system thereof which can easily set an operation environment of a program in a network environment where plural computers are connected.

Further, it is another object of the present invention to provide an environment setting method and system thereof which can easily set an operation environment of a program in accordance with information about an operation subject or an operation place and information about a user or the user's group.

Further, it is another object of the present invention to provide an environment setting method and system thereof which can easily set an operation environment for a program and more particularly, which can easily manage the operation environment by centralizing information to be set.

Still further, it is another object of the present invention to provide a conference system, where a conference is held with the use of plural computers connected via a network, and which can easily set an environment in accordance with information about an operation subject or an operation place and information about a user or the user's group.

Still further, it is another object of the present invention to provide a camera control system which can easily set an environment particularly in accordance with a viewing subject and viewers, or information about the viewers' group, wherein the camera control system is structured by plural computers connected via a network, or camera modules of which communication is controllable.

A group environment setting method in a network system consisting of plural computers where plural participants constitute a group and perform a cooperative operation, comprising the steps of: registering environment setting information for setting an application environment for the cooperative operation according to a group; reading, when a group is designated by a participant, environment setting information corresponding to the designated group from the registered environment setting information; and applying the read environment setting information as environment setting information of the participant who designated the group.

In order to attain the foregoing object, the present invention provides a group environment setting method for setting a group environment in a system where plural participants constitute a group for performing a cooperative operation, where environment setting information for setting an application environment for the cooperative operation is registered according to a group; when a group is designated by a participant, environment setting information corresponding to the designated group is read from the registered environment setting information; and the read environment setting information is applied as environment setting information of said participant who designated the group.

Herein, the aforementioned environment setting information includes a plurality of setting items. The environment setting information is registered in a hierarchical structure. Information which satisfies predetermined conditions is selected from the read hierarchized environment setting information for each of the environment setting items. The hierarchical structure is a multi-information hierarchical structure where each hierarchy includes environment setting information for a group and environment setting information for an individual. The predetermined conditions include a designation of an inheriting relationship in which environment setting items of the upper hierarchy are inherited by the lower hierarchy. The predetermined conditions also include a designation of an inheriting relationship distinguishable as to whether or not the environment setting items are to be inherited among hierarchies. Further, the inheriting relationship can be set for each hierarchy. The environment setting information is registered as a database or a structured document in a file system. The structured document is, for instance, structured in accordance with SGML (Standard Generalized Markup Language) (ISO 8879). A set of contents of the cooperative operation and a group is registered in advance so that the group can be uniformly specified from contents of a cooperative operation. The contents of the cooperative operation are applications which include television conference or cooperative editing operation. A set of applications and a group are registered in advance so that the group utilizing a certain application can be determined.

Further, the environment setting information includes a data access privilege for generation or reading of data related to the cooperative operation. The access privilege is designated as "none", nothing is allowed; "read only", only reading is allowed; "appendable", no change is allowed but additions of items are allowed; "insertable", no change in each item is allowed, but additions and changes in the relationship among items are allowed; "updatable", changes in each item and relationship among items are allowed; and "deletable", deletion is allowed. The environment setting information includes information for privacy protection such as allowance of limited attendants. The environment setting information includes rules for assigning a chairperson privilege or an operation privilege in a cooperative operation tool and the like. The environment setting information includes operation information such as specification of an operation corresponding to a mouse button, menu contents for mouse operation, or warning sound during a cooperative operation. The environment setting information includes display information which can identify a group. The display information capable of identifying a group includes any of colors for displaying a mouse cursor, colors for displaying mouse operation menu, screen display modes for participants of a cooperative operation, background filling patterns for screens of participants, frame filling pattern for screens of participants, or frame colors for screens of participants.

Still further, the environment setting information includes information for plural applications utilized in various processes of the cooperative operation, and an application corresponding to a process for the cooperative operation is selected from said plural applications and applied as environment setting information of said participant. A predetermined part of the environment setting information applied by the participant is redundantly stored and selection of environment setting information is left flexible.

A computer network system for cooperatively performing an operation by plural participants constituting a group, comprising: registering means for registering environment setting information for setting an application environment for a cooperative operation according to a group; reading means for, when a group is designated by a participant, reading environment setting information corresponding to the designated group from the registered environment setting information; and applying means for applying the read environment setting information as an environment setting information of the participant who designated the group.

Moreover, in order to attain the foregoing object, the present invention provides a computer network system for cooperatively performing an operation by plural participants constituting a group, comprising: registering means for registering environment setting information for setting an application environment for a cooperative operation according to a group, reading means for, when a group is designated by a participant, reading environment setting information corresponding to the designated group from said registered environment setting information; and applying means for applying the read environment setting information as an environment setting information of said participant who designated the group.

Herein, the environment setting information includes plural environment setting items. The registering means registers the environment setting information in a hierarchical structure, and the applying means includes selection means for selecting information satisfying conditions given by the read plural hierarchies of environment setting information for each of the environment setting items. The hierarchical structure is a multi-information hierarchical structure in which components of the hierarchy include environment setting information for a group and environment setting information for an individual. The conditions include designation of an inheriting relationship in which environment setting items of an upper hierarchy is inherited by a lower hierarchy. The given conditions include designation of an inheriting relationship distinguishable as to whether or not the environment setting items are to be inherited among hierarchies. The designation of the inheriting relationship can be set for each hierarchy. The registering means registers the environment setting information as a database or a structured document in a file system. The structured document is, for instance, structured in accordance with the SGML (ISO 8879). Further, the system comprises second registering means for registering a set of contents of a cooperative operation and a group in advance so that the group can be uniformly specified from contents of a cooperative operation. The contents of the cooperative operation are applications which include television conference or cooperative editing operation.

Moreover, the environment setting information includes a data access privilege for generation or reading of data related to the cooperative operation. The access privilege is designated as "none", nothing is allowed; "readonly", only reading is allowed; "appendable", no change is allowed but additions of items are allowed; "insertable", no change in each item is allowed, but additions and changes in the relationship among items are allowed; "updatable" changes in each item and relationship among items are allowed; and "deletable", deletion is allowed. The environment setting information includes information for privacy protection such as allowance of limited attendants. The environment setting information also includes rules for assigning a chairperson privilege or an operation privilege in a cooperative operation tool and the like. The environment setting information includes operation information such as specification of an operation corresponding to a mouse button, menu contents for mouse operation, or warning sound during a cooperative operation. The environment setting information includes display information which can identify a group. The display information capable of identifying a group includes any of colors for displaying a mouse cursor, colors for displaying mouse operation menu, screen display modes for participants of a cooperative operation, background filling patterns for screens of participants, frame filling patterns for screens of participants, or frame colors for screens of participants.

Further, the environment setting information includes information for plural applications utilized in various processes of the cooperative operation. The application means further selects an application corresponding to the process for the cooperative operation from the plural applications and applies as environment setting information of the participant. The system comprises a storing means for redundantly storing a predetermined part of the environment setting information applied by said participant, and instructing means for leaving flexibility in selection of environment setting information.

An environment setting method of setting an operation environment of a program in a network environment where plural computers are connected thereto, comprising the steps of: storing setting information of an operation environment in correspondence with an idea of a virtual place where the operation is executed; designating the place to obtain setting information; and setting the operation environment of a program by utilizing the setting information.

Moreover, in order to attain the foregoing object, the present invention provides an environment setting method of setting an operation environment of a program in a network environment where plural computers are connected thereto, comprising the steps of: storing setting information of an operation environment in correspondence with an idea of a virtual place where the operation is executed, designating said place to obtain setting information, and setting the operation environment of a program by utilizing said setting information. Herein the memory of said setting information is linked to a user or a user's group, and setting information is obtained in accordance with the place and the user or user's group. Further, by adding the step of changing the setting information, flexible setting is possible.

An environment setting method of setting an operation environment of a program in a network environment where plural computers are connected thereto, comprising the steps of: specifying a place where an operation is executed; obtaining environment setting information according to the place; and setting the operation environment of the program utilizing the environment setting information.

Moreover, in order to attain the foregoing object, the present invention provides an environment setting method of setting an operation environment of a program in a network environment where plural computers are connected thereto, comprising the steps of specifying a place where an operation is executed, obtaining environment setting information according to said place, and setting the operation environment of the program utilizing said environment setting information, thereby enabling easy setting of an operation environment or a program.

An environment setting method of setting an operation environment of a program in a network environment where plural computers are connected thereto, comprising the steps of: specifying a user or user's group who executes an operation; specifying a place where an operation is executed; obtaining environment setting information according to the place; and setting the operation environment of the program utilizing the environment setting information.

Still further, in order to attain the foregoing object, the present invention provides an environment setting method of setting an operation environment of a program in a network environment where plural computers are connected thereto, comprising the steps of specifying a user or user's group who executes an operation, specifying a place where an operation is executed, obtaining environment setting information according to said place, and setting the operation environment of the program utilizing said environment setting information, thereby enabling easy setting of an operation environment of a program.

An environment setting system which performs setting of an operation environment of a program in a network environment where plural computers are connected thereto, comprising: storing means for storing setting information of an operation environment in correspondence with an idea of a virtual place where the operation is executed; place designating means for setting an idea of a virtual place and designating a place where the operation is executed; setting information obtaining means for obtaining environment setting information according to the place; operation environment setting means for setting an operation environment of a program by utilizing the environment setting information.

Still further, in order to attain the foregoing object, the present invention provides an environment setting system which performs setting of an operation environment of a program in a network environment where plural computers are connected thereto, comprising: storing means for storing setting information of an operation environment in correspondence with an idea of a virtual place where the operation is executed, place designating means for setting an idea of a virtual place and designating a place where the operation is executed, setting information obtaining means for obtaining environment setting information according to said place, and operation environment setting means for setting an operation environment of a program by utilizing said environment setting information, thereby enabling easy setting of an operation environment of a program.

Herein the environment setting system further comprises user designating means for designating a user or a user's group, wherein the setting information obtaining means obtains environment setting information in correspondence with the place and the user or user's group.
The storing means includes a database having environment setting information accompanying each of the place. Moreover, by corresponding the idea of a virtual place to an actual place, realistic environment setting is possible.

An environment setting system which performs setting of an operation environment of a program in a network environment where plural computers are connected thereto by reading predetermined data from a storing medium, wherein the storing medium stores setting information of an operation environment in correspondence with a user or user's group and an idea of a virtual place where the operation is executed.

Further, in order to attain the foregoing object, the present invention provides an environment setting system which performs setting of an operation environment of a program in a network environment where plural computers are connected thereto by reading predetermined data from a storing medium, wherein the storing medium stores setting information of an operation environment in correspondence with a user or user's group and an idea of a virtual place where the operation is executed.

An environment setting system which performs setting of an operation environment of a program in a network environment where plural computers are connected thereto by reading predetermined data from a storing medium, wherein said storing medium comprises: an operation code for designating a user or user's group who executes an operation; an operation code for designating a place where the operation is executed; an operation code for obtaining environment setting information according to the place; and an operation code for designating the operation environment of the program utilizing the environment setting information.

Still further, in order to attain the foregoing object, the present invention provides an environment setting system which performs setting of an operation environment of a program in a network environment where plural computers are connected thereto by reading predetermined data from a storing medium, wherein the storing medium comprises: an operation code for designating a user or user's group who executes an operation, an operation code for designating a place where the operation is executed, an operation code for obtaining environment setting information according to said place, and an operation code for designating the operation environment of the program utilizing said environment setting information.

A conference system, where a meeting is held, utilizing plural computers connected in a network, comprises a meeting management program having the aforementioned environment setting system as a component.

Moreover, a camera control system consisting of plural computers connected via a network or communication-controllable camera modules, has the aforementioned environment setting system as a component.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram which explains problems provided by the conventional art;

FIG. 2 is a structural view of a network system utilized in a present embodiment;

FIGS. 3A and 3B are structural views showing an example of a structure of a registration table and environment setting information database utilized in the present embodiment;

FIG. 20 is a table showing an example of a structure of user-terminals according to the present embodiment;

FIG. 21 is a table showing one example of a group list stored in database;

DETAILED DESCRIPTION OF THE PREFERRED EMBODIMENTS

Figure 4:
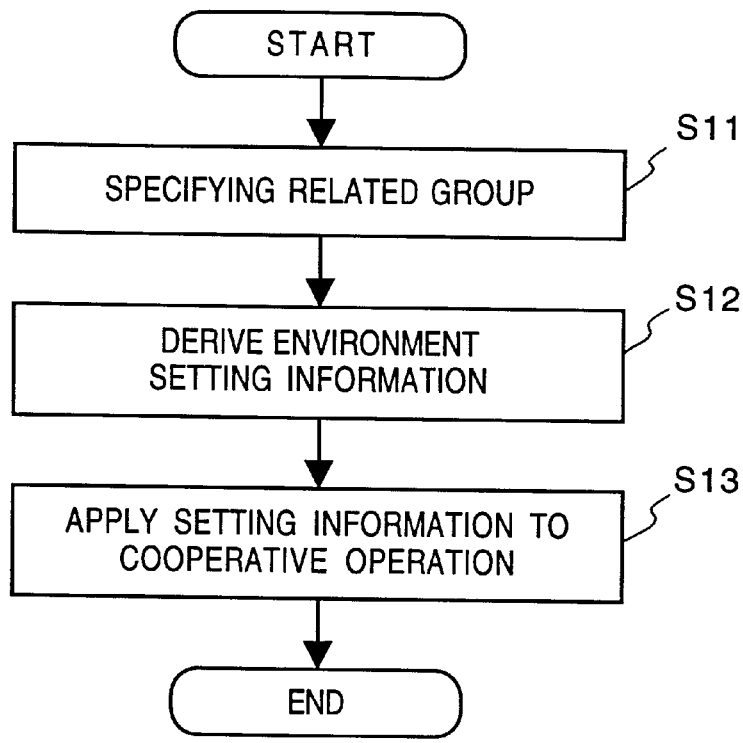
FIG. 4 is a flowchart describing a general process according to a first embodiment.

Preferred embodiments of the present invention will be described in detail in accordance with the accompanying drawings.

[First Embodiment]

In the first embodiment, an environment setting in a cooperative editing operation participated by plural persons is described. Particularly, an example is given where an environment for a cooperative operation is set for a group which consists of participants of the cooperative operation.

Note that for the purpose of easy understanding, descriptions are made particularly on an "access privilege of data used during a cooperative operation" in environment setting items set for each group. The access privilege defines a privilege for accessing each of files and includes contents such as "read only" or "addition allowed, but change of existing data not allowed" and so forth.

Further, the present embodiment is assumed to be situated where members belonging to, for instance, a user interface research group (hereinafter referred to as UI research group) carries on a discussion regarding "a specification of the next user interface" by utilizing a cooperative editing operation tool as a part of the regular meeting of the UI research group. Hereinafter, a structure of an apparatus is described in order to explain a form of the present embodiment, and operation steps thereof will be described next.

<Example of a System Structure>

FIG. 2 shows an example of a system structure according to the present embodiment. Reference numeral 10 denotes a terminal for a cooperative editing operation, configured with reference numerals 100 to 105 which will be described later. Reference numerals 20 and 30 denote terminals for a cooperative editing operation which have the same configuration as the terminal 10. Input/output processes for the cooperative operation is performed via the terminals 10, 20 and 30 by each user. Herein, descriptions are given on a structure where three terminals are utilized; however, the number of terminals may be two or more than four.

Reference numeral 401 is a database management system having an environment setting information database which stores environment setting information referred to by the terminals. Even though descriptions are given in the present embodiment in a case where the environment setting information database is utilized as a method of sharing data, the present invention is not limited to this. Reference numeral 500 denotes a communication network which enables the cooperative editing operation in the present embodiment throughout plural computers; Ethernet or FDDI or the like are given as an example. Since general computers are employed in the present embodiment, a computer network is utilized as a communication network; however, a wide-area network such as an ISDN may be also utilized.

Next, a structure example for each of the terminals 10, 20 and 30 will be given.

Reference numeral 100 denotes a communication device such as a controller for an FDDI (Fiber Distributed Data Interface) to be connected to the computer network; 101, an input device such as a keyboard, mouse, and the like, or a microphone or the like, for inputting a command or data by a user of a program used in the first embodiment; 102, a CPU for operating a cooperative operation tool and executing system programs according to the present embodiment. Herein, each of the terminals 10, 20 and 30 is controlled by a CPU; however it is also possible that each of devices in each of the terminals 10, 20 and 30 includes an individual CPU.

Reference numeral 103 denotes an output device for displaying processes and contents of an environment setting and a cooperative editing operation on which an environment is set and executed according to the present embodiment, such as a CRT display, a projector and the like. For the purpose of a simple explanation, uniform display devices are utilized herein for displaying the contents of the environment setting and cooperative editing operation; however, different display devices may be utilized. Reference numeral 104 denotes a memory for storing the contents of the environment setting described in the first embodiment, programs for group specification and selection of a system and data for these programs. For the purpose of simple explanation, uniform memories are utilized herein; however different memories may be utilized for each storing subject, or a hierarchized memory which includes a secondary memory such as a hard disc may be utilized. The memory may separately include a main memory for storing temporary data, and a secondary memory for permanently storing vast amount of data. Further, the memory may also include a read-only memory (ROM) for storing permanent data without consideration of a situation of an apparatus. Moreover, a program may be stored in an external memory medium such as a floppy disc serving as a secondary memory, and may be loaded to a temporary memory consisting of a RAM to be executed.

Reference numeral 105 denotes an internal bus which connects the above described components 100 to 104.

FIGS. 3A and 3B show examples of a structure of a group registration table and environment setting information database utilized in the present embodiment.

FIG. 3A shows an example of a registration table 104a where each cooperative operation group is registered in correspondence with a predetermined identifier. Note that the registration table 104a may be utilized such that the contents of the registration table 104a are stored in each of the memory 104 of the terminals 10, 20 and 30, or stored in one of the terminals to be shared by all the terminals, or stored in the environment setting information database. FIG. 3B shows an example of data 401a related to a cooperative operation group included in the environment setting information database 401. Detailed explanations of the contents of the environment setting information will be given in the following operation steps of the present embodiment.

Note that a structure of the data 401a related to the cooperative operation group shown in FIG. 3B is extended to support hierarchized environment setting information utilized in the second embodiment. Therefore, in the first embodiment, a part of the data structure will be utilized. That is, identifiers registered in the group registration table (such as #3213 and #3000 in 401a), names of cooperative operation groups which correspond to the identifier (such as "UI research group regular meeting" and "regular meeting" in 401a), and various environment setting information stored in a section "PRIVATE" of an item "Environment Setting Information" (detailed will be described below), will be utilized.

<Operation Step of the Present Embodiment>

Next, a general operation step according to the present embodiment will be discussed and details thereof will be explained below.

FIG. 4 shows operation steps of an environment setting process of a group unit for a cooperative editing operation operated with a structure shown in FIG. 1.

In the process described below, steps S11 and S12 are executed by a terminal, i.e. the terminal 10, in which predetermined participants input their name of a group and an environment setting command, and which is connected to the communication network 500.

A process in step S13 is executed by the terminal and computer terminals used by other participants belonging to a same group. In other words, the terminal, from which the participant's group name and environment setting command are inputted, sends environment setting information obtained from the database management system 401 to computer terminals utilized by other participants in a same group via the communication network 500. Meanwhile, each of the terminals which receives the environment setting information performs a process applicable to a cooperative operation process predeterminedly defined to the group, according to the received environment setting information.

Figure 5:
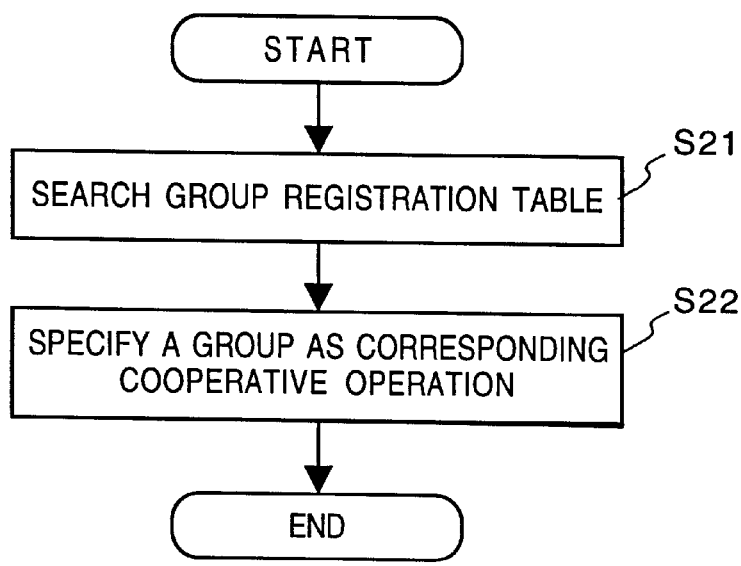
FIG. 5 is a flowchart describing a step of specifying a particular group according to the first embodiment.
Figure 6:
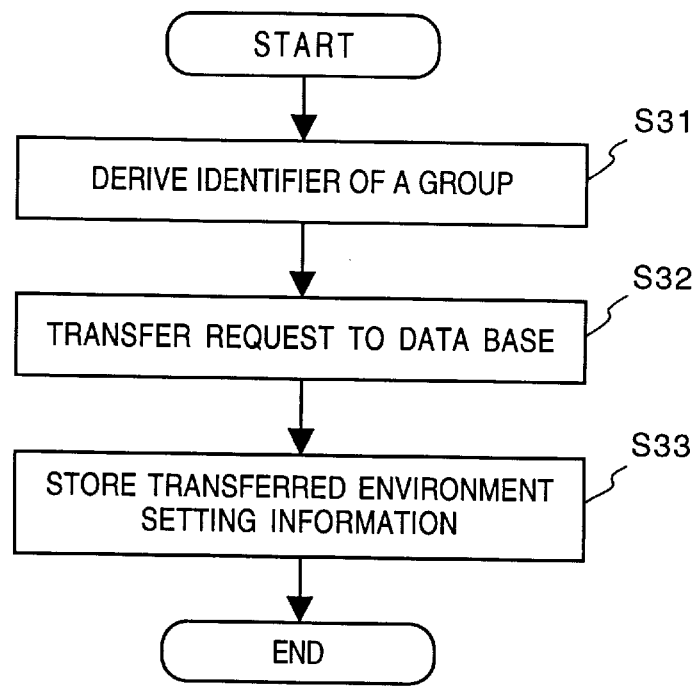
FIG. 6 is a flowchart describing a deriving step of deriving environment setting information according to the first embodiment.
Figure 7:
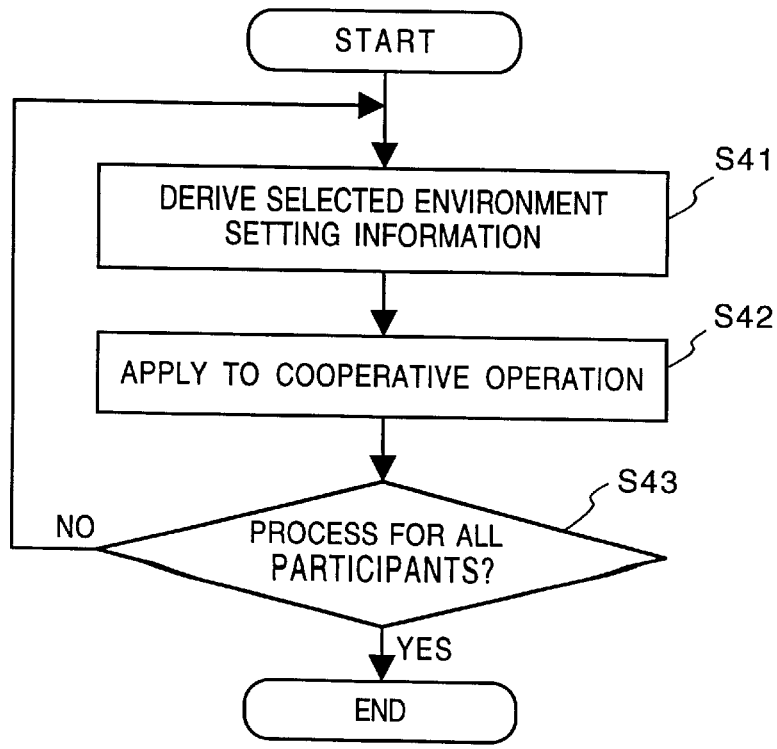
FIG. 7 is a flowchart describing a step of setting an environment according to the first embodiment.

Hereinafter, the general process will be described with reference to a flowchart in FIG. 4, and detailed descriptions will be given with reference to FIGS. 5, 6 and 7.

Step S11 in FIG. 4 is a process in the terminal from which predetermined participants input their group name and environment setting command and which is connected to the communication network 500. For instance, at the terminal 10, the predetermined participants' group name and environment setting command are inputted from the input device 101. The terminal 10 searches the group registration table stored in the memory 104 in correspondence with the inputted environment setting command, to confirm that the inputted group name is registered and obtain a corresponding identifier. If it is not registered, a predetermined error message is displayed in the output device 103 and wait for another input of a group name and an environment setting command by the participant.

In step S12, environment setting information of the corresponding group is derived from the environment setting information group stored in the database 401. For instance, the information is obtained by requesting the database to derive the environment setting information related to a cooperative operation by utilizing the group name specified in step S11 as a keyword.

In step S13, the terminal, from which the participant's group name and the environment setting command are inputted in step S11, sends the environment setting information derived in step S12 as well as an environment information application command to computer terminals utilized by other participants in a same group via the communication network 500.

Meanwhile, each of the terminals which received the environment setting information and environment information application command performs a process applicable to a cooperative operation process predeterminedly defined to the group, according to the received environment setting information. Also, the terminal which has sent the environment setting information and environment information application command performs a process applicable to the cooperative operation process predeterminedly defined to the group.

Hereinafter, the foregoing general operation step will be explained utilizing more detailed flowchart.

<Specification of Group: Description of Step S11>

An operation step for specifying a group for a cooperative operation in step S11 in FIG. 4 will be described with reference to FIG. 5. The group name specified herein will become a keyword for deriving environment setting information in an ensuing environment setting process.

Either a group name or its identifier related to the cooperative editing operation is inputted from the input device 101, and the corresponding group name or the identifier will be searched and identified by referring to the group registration table (FIG. 3A) before execution of the cooperative operation (step S21).

A participant of the cooperative editing operation, e.g. an editor, designates a group from the group registration table and specifies it as a cooperative operation group (step S22).

The following explanations will be continued with an assumption that a "UI research group regular meeting" whose identifier is "%3213" is specified as a group for a cooperative editing operation.

Herein, it is explained that the searched group in a group registration table is directly designated, however, it is also possible to indirectly designate a specific group by specifying, for example, a group consisting of users who currently run an application called "CoDrawTool" and a group consisting of users who run a workstation called "cawgw" between 13:00 and 15:00 on Jun. 16, 1994, and searching for the corresponding group.

In order to detect a group consisting of users who currently run the application "CoDrawTool," the following process is performed.

1. The application name "CoDrawTool" is inputted by an arbitrary computer terminal (C1) in a network.
2. The computer Terminal (C1) sends a predetermined command inquiring each of computer terminals (Cn (n=2, 3 . . . )) connected to the network, whether or not the application name "CoDrawTool" is currently running in their computers.
3. When each of the computer terminals (Cn (n=2, 3, . . . )) receives the command, each computer terminal determines whether or not "CoDrawTool" is included in the currently-running applications and response which is the result of the determination is returned to the computer terminal (C1).

4. The computer terminal (C1) receives the response and designates each of the computers which is currently running the application "CoDrawTool" as belonging to the same group.

Further, in order to detect users who used the workstation "cawgw" during the above designated period of time, the following process can be performed.

1. The name of the workstation "cawgw," which is connected to a network, and the designated period of detection (from 13:00 to 15:00 on Jun. 16, 1994) are inputted by an arbitrary computer terminal (C1) in the network.

2. The computer terminal (C1) sends the inputted period of detection and a count instruction command to the workstation "cawgw" which is connected to the network for counting the number of users during the designated period of time.

3. When the workstation "cawgw" receives the command and the period of detection, the workstation notifies the designated starting time and ending time of the period of detection to a CPU (not shown ) of the workstation, utilizing an embodied timer (not shown), accumulatively records each of the users' names who have used the workstation during the designated period of time in an embodied memory (not shown), and returns the recorded users' names to the computer terminal (C1).

4. The computer terminal (C1) receives the users' names and designate each of the users as belonging to the same group.

<Deriving Environment Setting Information; Description of Step S12>

In the present embodiment, database system is employed to share environment setting information of a cooperative editing operation operated in a group unit. In step S12, environment setting information of a designated group is derived from the database and the detailed operation step is shown in FIG. 6.

An identifier of a specified group is derived from a group registration table to be utilized as a search keyword in the database (step S31). Herein, for instance, "%3213" is assumed to be the identifier.

A request for transferring environment setting information related to the derived search keyword is issued to the database system 401 which shares environment setting information (step S32).

Environment setting information related to the search keyword is derived from the database system 401 and stored in a memory 104 (step S33).

In the present embodiment, the following information is derived from the database system 401 as environment setting information corresponding to the cooperative editing operation group, e.g. called "UI research group regular meeting."

Note that the following environment setting information is stored in the "PRIVATE" section of the environment setting information in FIG. 3B and has a data structure of the following form: session A {element1=value1; element2=value2; . . . }. The above data structure denotes that the environment setting information relates to A; and the items, element1, element2 . . . , are set as value1, value2 . . . respectively.

According to the present embodiment, contents of the derived environment setting information related to e.g. "UI research group regular meeting" can be shown as follows:

```
session UI_research_group_regular_meeting {
    notifyOnStart = "yes";
    broadcast = "no";
    title = "UI research group regular meeting";
    network = "FDDI:computer fundamental research
        department network";
    member = "takasi, kazu, nobol, yama, kuro";
    chairedBy = "takasi";
    agendaTo = "agenda @ archive.ccb, kuro @ ccb";
    behavior = {
        keyBinding = "defaultKeyMap";
        mousebinding = "UI-group-MouseMap";
    };
    roomReservation = "no";
    duration = "*Wed 15:00–17:30";
    place = "_";
    accessibility = "insertable";
    ciphering = "no";
    floorPolicy = "freeDiscussion";
};
```

Particularly, the item "accessibility," representing an "access privilege for data operated during a cooperative editing operation" in which attention is paid in the descriptions of the present embodiment, is set "insertable," in other words, "change in each item is not allowed but additions as well as change in the relationship among items are allowed."

In the first embodiment, management for storing the environment setting information is relied upon the database which enables searching by conditions; however, it is also acceptable to have only a simple environment setting list for each cooperative operation environment.

Hereinafter, each of the information items of environment setting information for "session UI research group regular meeting" will be briefly described.

The item "notifyOnStart" designates whether or not a predetermined meeting start message, which notifies starting of a meeting, is to be sent to each computer terminal which is used by group members designated in the item "member," from a computer terminal used by a user designated in the item "chairedBy" which performs operations as a chairman of the "UI research group regular meeting," at the time of starting the "UI research group regular meeting" by users of each of the computer terminals. If the item "notifyOnStart" is set as "yes", the meeting start message is sent, and if it is set as "no," the meeting start message is not sent.

The item "title" shows the title of the regular meeting; the item "agendaTo" destinations to which an agenda is to be sent; and the item "roomReservation", whether or not it is necessary to reserve a conference room for the regular meeting. The item "duration" shows that from 15:00 to 17:30 on every Wednesday is the time for the regular meeting.

<Environment Setting; Description of Step S13>

In step S13, the derived contents of environment setting is applied to the cooperative operation. FIG. 7 shows details of the operation step. Hereinafter, descriptions are given on how the derived environment setting items are set according to each of the participants, and a method of setting an environment for an entire cooperative editing operation is explained.

The environment setting information stored in step S33 is derived (step S41), and a command to apply the environment setting and the environment setting information are sent to other terminals in the same group via the communication network 500.

Each of the terminals which receives the command to apply the environment setting and the environment setting information sent in step S41 performs operation applicable to the cooperative operation defined for the group (step S42). Taking an access privilege as an example which is the focused point in the present embodiment, selection of a starting mode related to an application software utilized commonly by participants of the cooperative editing operation, or change of the access privilege in a set resource referred at the time of the operation are applied, according to a type of an access privilege to be set. When the operation of applying is completed, each terminal returns confirmation data to confirm completion of the applying operation to the terminal which has sent the command to apply the environment setting and the environment setting information via the communication network 500.

In step S43, the terminal which has sent the command to apply the environment setting and environment setting information receives the confirmation data which confirms completion of each applying operation. For each of those terminals which does not send the confirmation data to confirm completion of an applying operation, the process returns to step S41 to repeat the above process. When the confirmation data to confirm completion of the applying operation is received from all the terminals in the same group, the process ends.

In the cooperative editing operation tool according to the present embodiment, the following levels are assumed as an access privilege to data related to the above described cooperative operation:

"none": nothing is allowed;

"readonly": only read is allowed;

"appendable": no change is allowed but additions of items are allowed;

"insertable": no change in each item is allowed, but additions and changes in the relationship among items are allowed;

"updatable": changes in each item and relationship among items are allowed. Herein, there are plural items for data related to cooperative operation, and relationship among these items is assumed to be defined.

For example, if "collection of data in alphabetical order" is defined as a relationship among items, such as <a, b, c, d>, the relationship can be changed to <b, a, c, d> or the like;

"deletable": deletion is allowed.

As can be seen from the obtained items, the setting of an access privilege according to the present embodiment with regard to data operated in cooperative editing operation, is commonly set in the group, such as "changes in contents of each item of editing are not allowed but additions of the editing items and changes in the relationship among editing items are allowed."

In the first embodiment, shared setting of an access privilege for each group in a cooperative editing operation has been described. Shared setting enables an access to an editing subject in a coherent manner by members belonging to the same group which operate in a cooperative editing environment. Compared to a case where a participant of the cooperative operation sets the operation environment on an individual basis, unintended change or deletion of an editing subject is prevented, thereby enabling a secure and coherent cooperative editing operation.

In the first embodiment, descriptions have been given with an assumption based on a case where information necessary for environment setting is derived prior to execution of an application such as a cooperative editing operation tool. The similar descriptions can be applied to a case where contents of environment setting is derived upon request even during the execution of the application.

Further in the first embodiment, an explanation has been provided on an example of applying an environment setting information for a predetermined cooperative operation. However it is also possible to provide environment setting information utilizing an environment setting application. Moreover, the environment setting application can be readily applied to a cooperative operation environment.

In the first embodiment, a cooperative editing operation has been explained; similarly, the method of cooperative operation environment setting according to the present invention can be applied to a television conference system, brain storming support system and the like.

[Second Embodiment]

As a second embodiment of the present invention, an example for storing environment setting information in a hierarchized structure and setting inheriting relationship among the hierarchies will be described. The descriptions are given for an example where an environment is set in a group unit for a cooperative editing operation participated by plural persons, as similar to the first embodiment.

Particularly, as one technique for sharing environment setting information in a group unit, an example is given herein where sharing is realized by hierarchizing the environment setting information in a unit of a group and inheriting the environment setting information to each hierarchy. Moreover, in hierarchized environment setting items, items inherited by a lower hierarchy (item "PUBLIC" in 401*a* in FIG. 3B) are distinguished from items not inherited by the lower hierarchy (item "PRIVATE" in 401*a* in FIG. 3B). This feature represents the characteristic of the present embodiment which enables flexible environment setting using different item information between the items of "PUBLIC" and "PRIVATE".

Since hierarchized environment information is utilized in the present embodiment, the second embodiment can be basically configured by substituting the deriving step described in the first embodiment with "deriving operation step of hierarchized structure" and "selection operation step" which will be described below.

<Deriving Operation Step of Hierarchized Structure>

Figure 8:
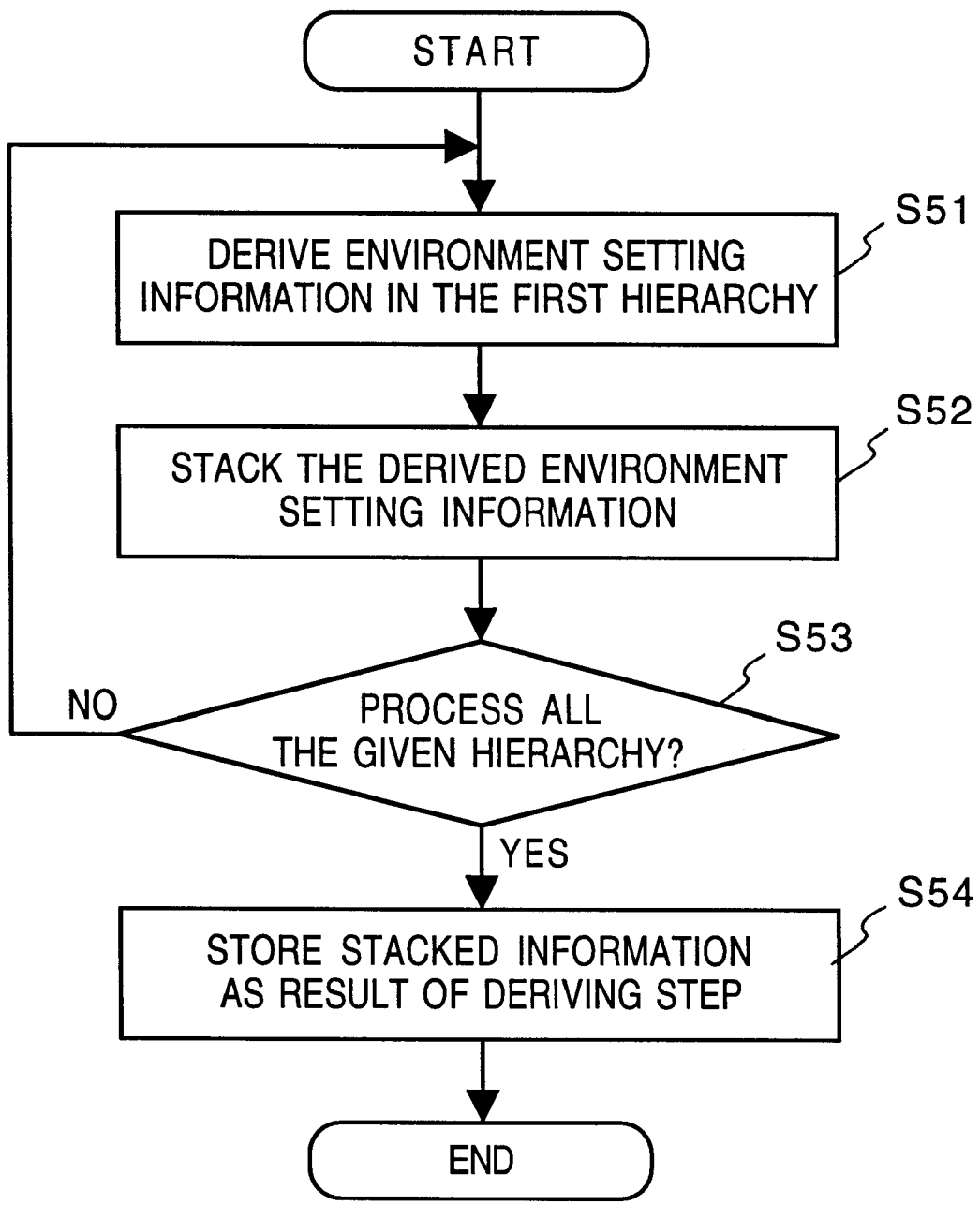
FIG. 8 is a flowchart describing a step of deriving environment setting information from a hierarchical structure according to a second embodiment.
Figure 9:
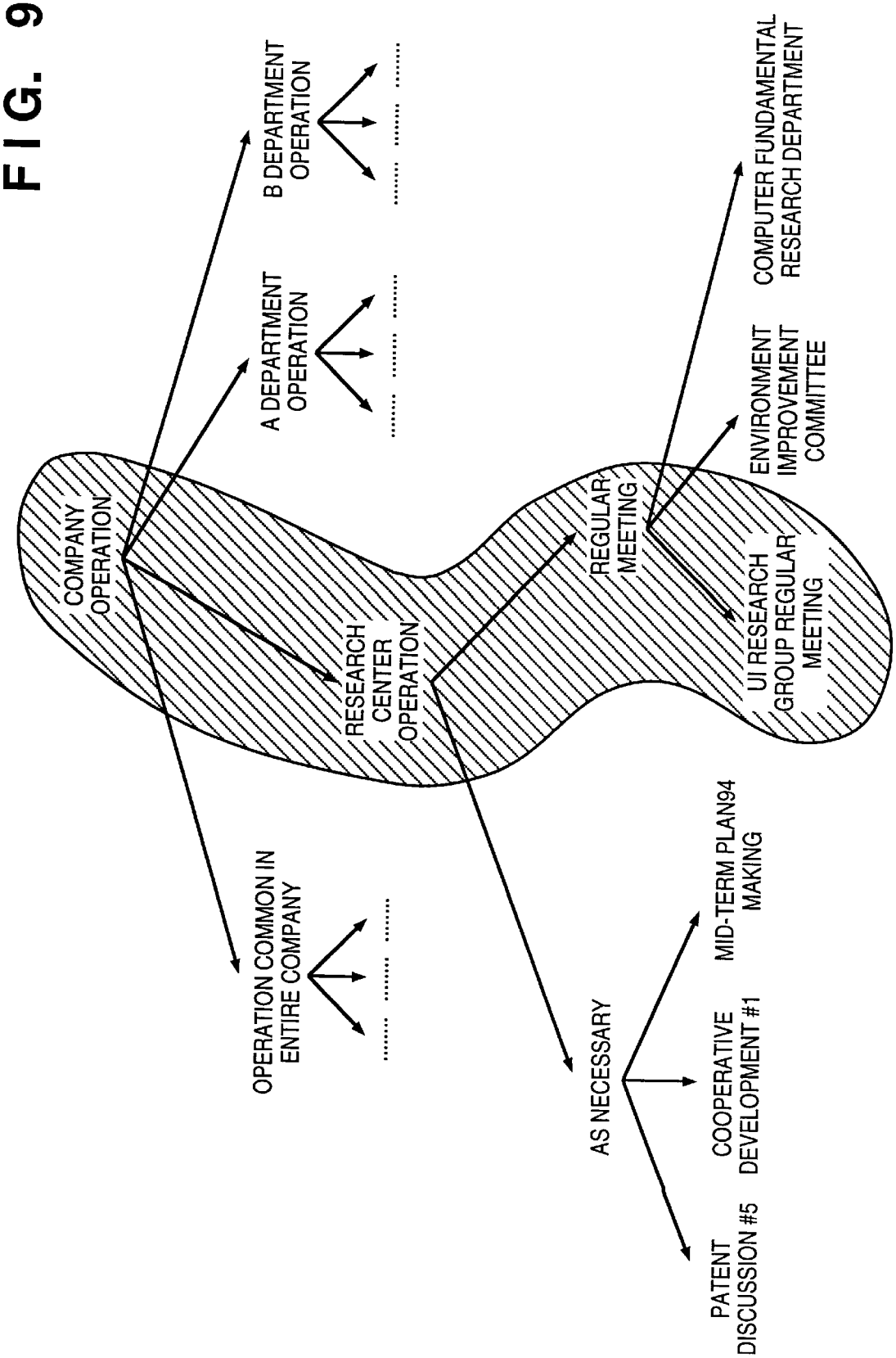
FIG. 9 is a diagram for explaining a cooperative operation hierarchy utilized in the second embodiment.

Necessary environment setting information is derived from a database which stores hierarchized environment setting information by traversing the hierarchies of a group for a given cooperative operation (see FIG. 8). Herein, since a group for a cooperative editing operation is specified to e.g. "UI research group regular meeting" (see FIG. 9) the hierarchy is assumed to be set as "company operation→research center operation→regular meeting→UI research group regular meeting." Hereinafter, steps of obtaining necessary environment setting information will be described with reference to a flowchart in FIG. 7.

Environment setting information in a first hierarchy is derived from the database (step S51).

The derived setting information is stacked on an environment setting information stack (step S52).

With regard to a given hierarchy, the steps S51 and S52 are repeated in the order of upper to lower hierarchies (step S53).

The stacked information in the environment setting information stack is stored (step S54).

In the second embodiment, environment setting information stack such as those described below is derived. The following is listed in an order of top-to-bottom of the stack.

1: environment setting information defined in the "UI research group regular meeting"
2: environment setting information defined in "regular meeting"
3: environment setting information defined in "research center operation"
4: environment setting information defined in "company operation"

Since the hierarchy is traversed from an upper hierarchy to a lower hierarchy, the environment setting information is stored in a stacked structure; however even if the hierarchy is traversed from a lower hierarchy and the environment setting information is stored in a queue structure, similar data can be structured. Further, even if other data structure is utilized, it is applicable as long as the order among the hierarchies is retained.

<Example of Environment Setting Information Stack>

Contents of the environment setting information stacked on the environment setting information stack are expressed in a hierarchized data structure as shown below, similar to the first embodiment. Herein, session A:B{ element1=value1; element2=value2; . . . }; denotes that the environment setting information relates to A, A is positioned in a lower hierarchy of B, and the items, element1, element2, . . . , are set as value1, value2, . . . respectively. If an identical item is defined both in a lower hierarchy and an upper hierarchy, setting in the lower hierarchy is prioritized. Note that items shown under "public:" are stored in the section "PUBLIC" in "environment setting information" in 401a and are to be inherited by lower hierarchies. Contrary, items shown under "private:" are items of the environment setting information stored in the section "PRIVATE" in "environment setting information" in 401a and are not inherited by lower hierarchies.

Herein for the purpose of simplifying an explanation, descriptions are given in a case where a hierarchized structure is formed by a uniform inheritance in which an upper hierarchy is uniformly designated. Multiple inheritance which allows designation of plural upper hierarchies is readily applicable to designate an appropriate inheritance of a hierarchy group for each category of the environment setting items.

An example of contents of obtained environment setting information stack according to the present embodiment is shown below.

```
        session company_operation: {
        public:
          network = "Ethernet:technology-type network";
          accessibility = "readonly";
          behavior = {
            mouse Binding = "defaultMouseMap";
            keyBinding = "defaultKeyMap";
          };
        };
        session research_center_operation
      : company_operation {
        public:
          network = "FDDI:research center network";
          agendaTo = "agenda @ archive.ccb";
          accessibility = "appendable";
          ciphering = "DES";
        private:
          floorPolicy = "chairmanControl";
          chairedBy = "takahashi";
          agendaTo = "agenda @ archive.ccb, staff @ ccb";
          broadcast = "yes";
        };
        session regular_meeting
```

```
      : research_center_operation {
        public:
          notifyOnStart = "yes";
          roomReservation = "yes";
        private:
          broadcast = "no";
          floorPolicy = "chairmanControl";
        };
        session UI_research_group_regular_meeting
      : regular_meeting {
        public:
          title = "UI research group regular meeting";
          network = "FDDI: computer fundamental research
              department network";
          member = "takasi, kazu, nobol, yama, kuro";
          chairBy = "takasi";
          agendaTo = "agenda @ archive.ccb, kuro @ ccb";
          behavior = {
            mouseBinding = "UI-group-MouseMap";
          };
        private;
          roomReservation = "no";
          duration = "*Wed 15:00–17:30";
          place = "_"
          accessibility = "insertable";
          ciphering = "no";
          floorPolicy = "freeDiscussion";
        };
```

As exemplified above, an inheritability is expressed in two attribute values: "public:" and "private:" and the setting in a lower hierarchy is prioritized. Similarly, it is possible to set an appropriate environment that matches a characteristic of each organization or a group by combining the inheritability and inheritance order, or additionally combining contents of the setting at each hierarchy.

[Selection of Appropriate Environment Setting Information]

Figure 10:
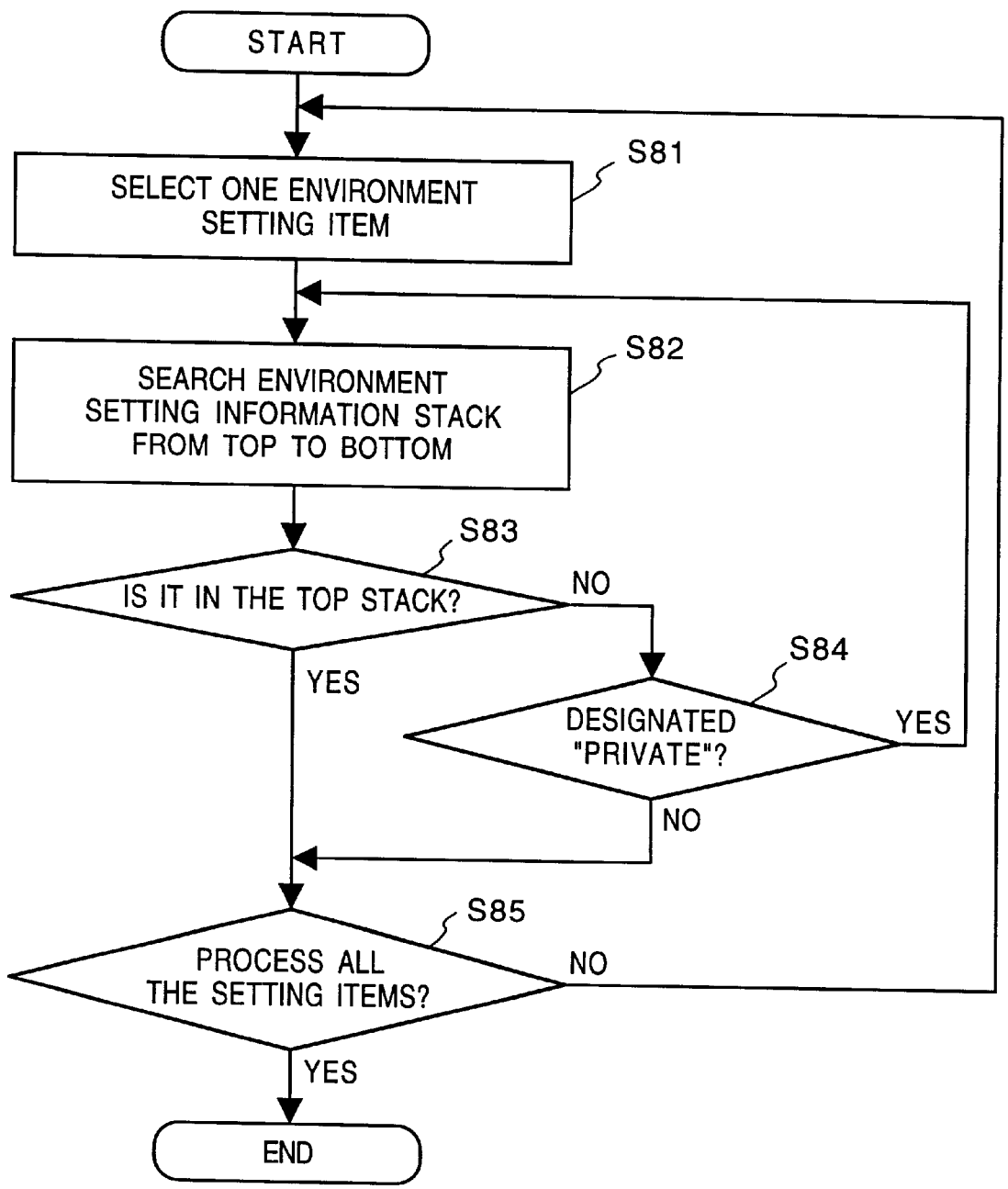
FIG. 10 is a flowchart describing a selection step according to the second embodiment.

In the following step, explanations are given with reference to FIG. 10, for selecting an appropriate environment setting information from the environment setting information stack obtained by storing the order relationship of the hierarchy by the deriving operation step of hierarchized structure. To select an appropriate environment setting information, "public:" and "private" which show the inheritability to the lower hierarchy are considered.

Hereinafter, the selection process of an appropriate environment setting information will be explained with reference to a flowchart in FIG. 10.

One of environment setting information items is selected (step S81).

Environment setting information stack is searched from the top and a setting which corresponds to the selected item is selected (step S82).

If the selected item is defined to be on the top stack, that is, defined to be in the lowest hierarchy of the hierarchized structure, that item is selected (step S83).

If the selected item is designated as "private:" and not included on the top stack, the process returns to step S82 to search for a corresponding item from environment setting information in the next stack (step S84).

Steps S81 to S84 are repeated for all the environment setting items (step S85).

According to the second embodiment, items for environment setting such as the followings are selected.

```
        notifyOnStart = "yes";
        broadcast = "yes";
        title = "UI research group regular meeting";
        network = "FDDI: computer fundamental research
```

-continued

```
department network";
    member = "takasi, kazu, nobol, yama, kuro";
    chairedBy = "takasi";
    agendaTo = "agenda @ archive.ccb, kuro @ ccb";
    behavior = {
        keyBinding = "defaultKeyMap";
        mouseBinding = "UI-group-MouseMap";
    };
    roomReservation = "no";
    duration = "*Wed 15:00–17:30";
    place = "_";
    accessibility = "insertable";
    ciphering = "no";
    "freeDiscussion";
```

As a result, for an item "accessibility" representing an "access privilege for data operated during cooperative editing operation" where an attention is paid in the second embodiment, "insertable" is obtained as similar to the first embodiment.

In the second embodiment, the inheritability has been expressed in two items: "public:" and "private:". In addition, items which allow inheritance only to a direct lower hierarchy can be set. Moreover, an inheritability which does not allow priority to a lower hierarchy can be also set by designation of "absolute:" or the like.

Further, a keyword is not limited to the above described words. For example, "shared:" or "own:" may be utilized.

For the purpose of a simple explanation, a hierarchized structure has been described as an example of structuring an environment setting. Structuring of an environment setting may also be realized by a network-type structure in which environment setting information is linked together.

Moreover, for the purpose of simplifying the description, the database system has been utilized for storing hierarchized environment setting items in the present embodiment. A file system, which stores structured documents structured by utilizing the SGML expression (IS08879) in which a hierarchical structure is realized by an appropriate DTD (Document Type Definition), may also be utilized.

In the hierarchical structure which defines environment setting, all structuring is done in a group unit according to the second embodiment. In addition, an extended hierarchical structure may also be realized in which an individual environment setting information is attached to the group in the upper hierarchy. For example, when the setting of a group is set as "only additions to editing items are allowed" with respect to data operated during a cooperative editing operation, an environment setting for a particular person (such as a supervisor or a mediator) who is positioned in a lower hierarchy of the data can be set as "writing and changing allowed".

[Third Embodiment]
<Other Application Example for Access Privilege>

Hereinafter, as a third embodiment of the present invention, an application example of an access privilege besides those exemplified in the foregoing embodiments will be described. In the first and second embodiments, the explanation is focused on an "access privilege for data operated in a cooperative operation" in the environment setting items set for each group. For contents of environment setting, the following items can be additionally considered.

<Application Software>

Figure 11:
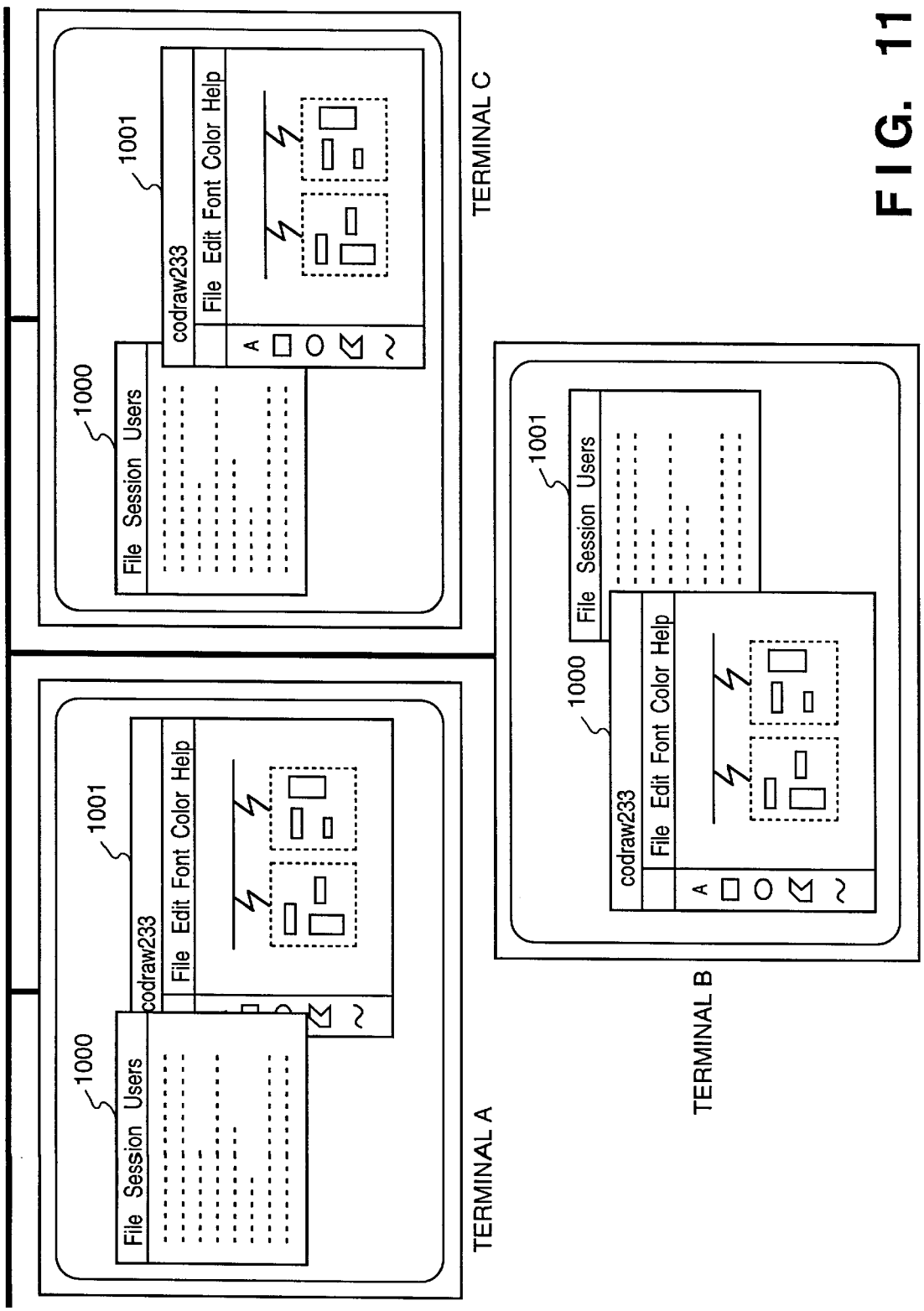
FIG. 11 is a diagram showing an application of "application software" according to a third embodiment.

In order to assure data exchangeability, it is set so that a drawing tool or a document editor utilized in a group can be shared in a group (see FIG. 11). FIG. 11 shows one example of such setting; when terminals A, B and C are in a same group, a drawing tool 1000 and a document editor 1001 used by each terminal are shared. Vice versa, it is set so that an operation tool or an operation type can be switched for same type of data depending on whether if it is an editing group or a presentation group.

<Layout>

Figure 12:
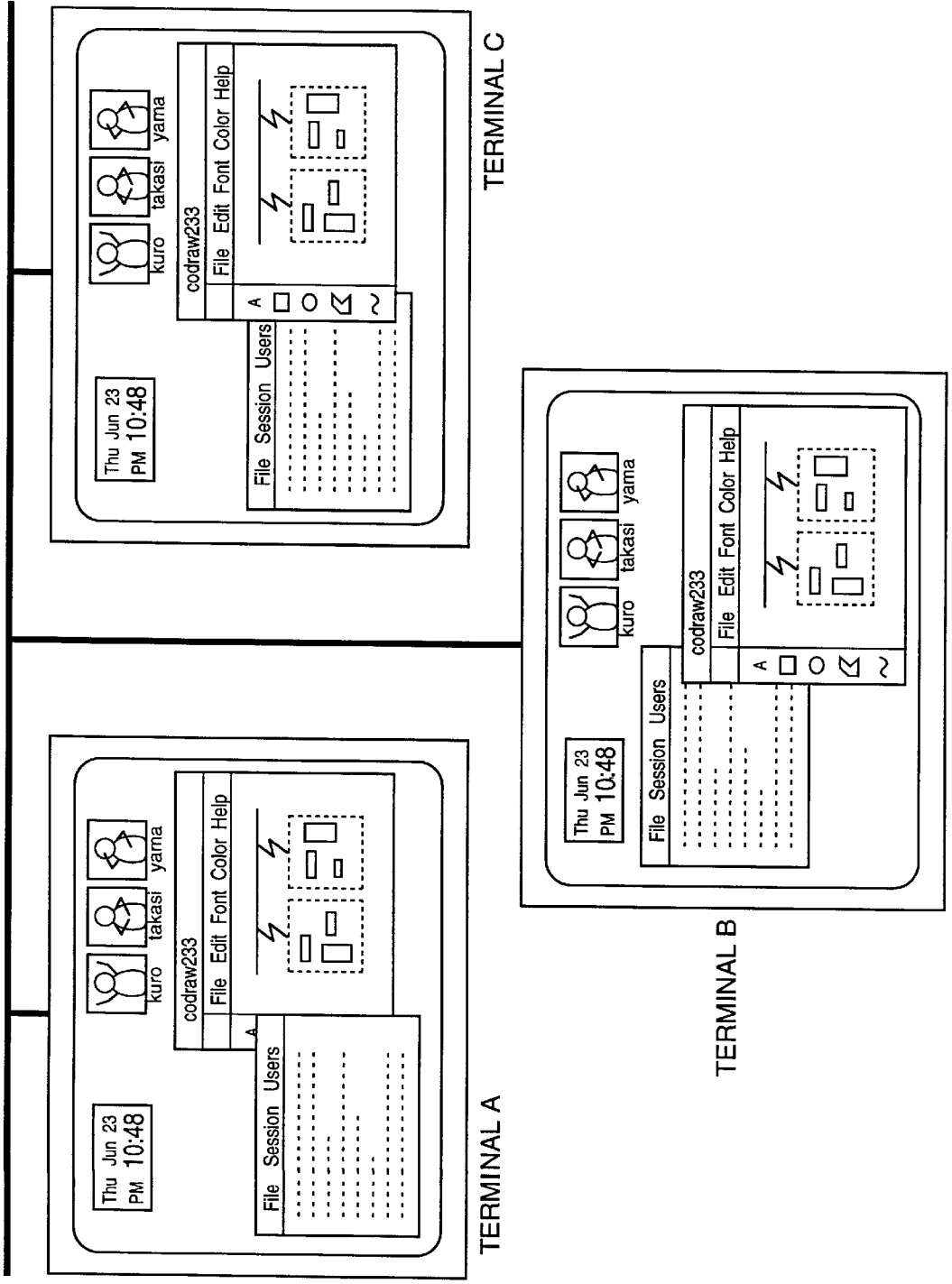
FIG. 12 is a diagram showing an application of "layout" according to the third embodiment.

Usage such as "clock is placed at the top left corner and windows shown as icons are arranged at the bottom of the display" is set to be shared within a group. FIG. 12 shows an example applying a shared layout with respect to a clock tool and participants' display windows.

<Background>

The same background to be displayed is set for each group. For example, a window for a particular application such as a group meeting, a common background may be given to the members of the group. This enables a person to change his/her attitudes according to respective groups when he/she is involved with plural groups.

<Setting Menu>

Figure 13:
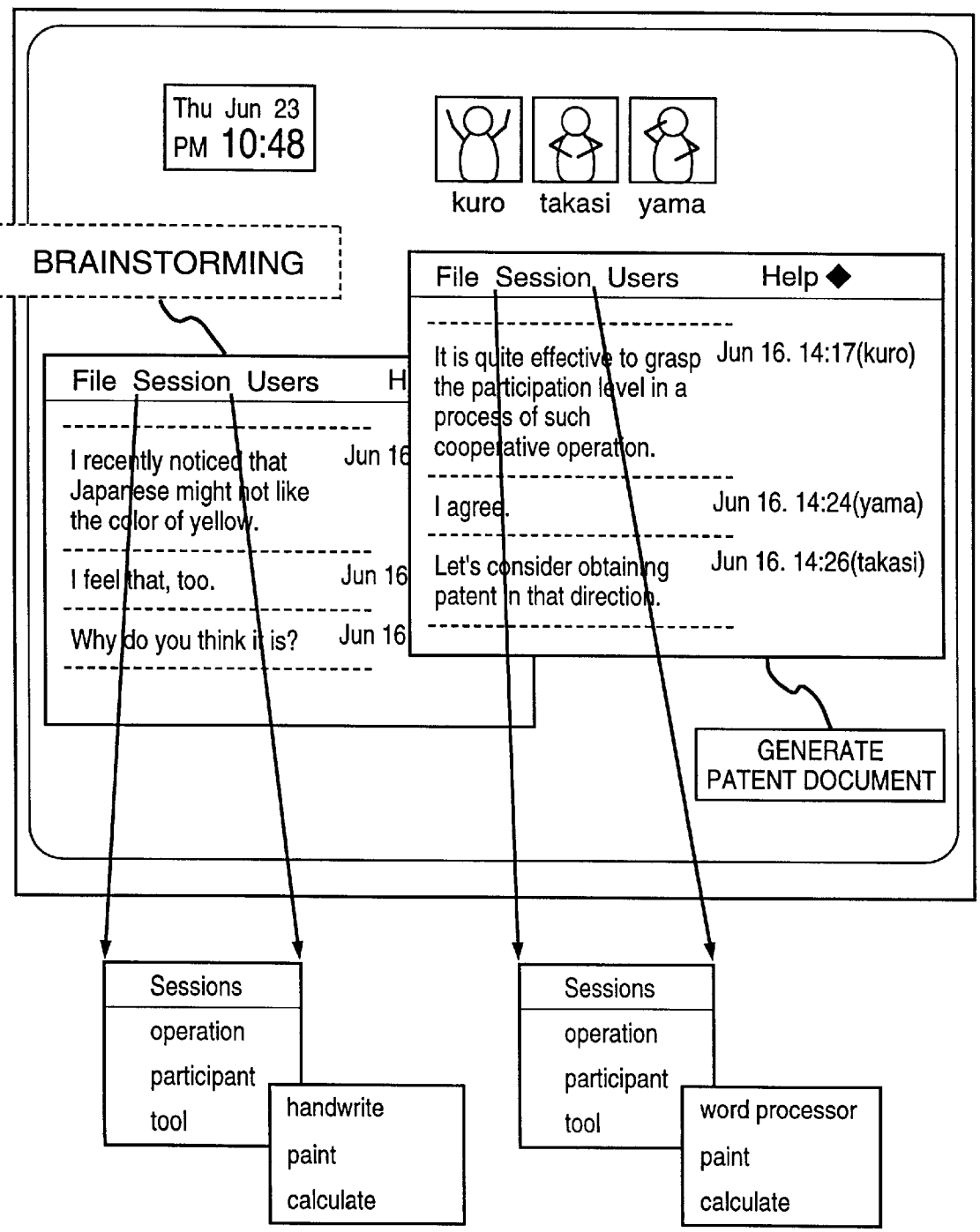
FIG. 13 is a diagram showing an application of "set menu" according to the third embodiment.

Even in a case where the same user uses one application, environment may be set as such that contents of a menu can be changed depending on for which operation the application is used. For instance, for a group applying a cooperative editing operation tool for brainstorming, a start-up menu for a free-hand drawing input tool is set; and for a group applying the cooperative editing operation tool for creating patent documents, a start-up menu for a word processor tool is set (FIG. 13).

The similar explanation applies to a mouse or key binding for applications or tools used in a cooperative operation.

<Access Privilege>

An access privilege (protection code for a file) related to data operated in a cooperative editing operation is set. This includes setting for privacy protection related to a video conference (e.g. allowance of limited participants).

<Policy>

A policy such as rules for assigning a chairperson privilege or an operation privilege in a cooperative operation tool is set.

[Fourth Embodiment]
<Example of Allowing Individual Selection>

Hereinafter, as a fourth embodiment of the present invention, an example is given for allowing an individual selection.

In the first, second and third embodiments, descriptions have been provided for a most fundamental example in which no flexibility is provided in contents of setting in the environment setting items set for each group, so that all the setting is specified. However, for a practical cooperative operation, it is effective to leave flexibility in selecting contents of the environment setting in order to satisfy preference of participants or situation change in the cooperative operation. In the fourth embodiment, an example is provided for leaving a flexibility in selection of environment setting in a word processor tool used in a cooperative operation.

Herein, as described in FIG. 13, a situation is assumed that a menu is selected for starting a word processor tool in a group utilizing a cooperative editing operation tool for creating patent documents. As a word processor tool started for the foregoing purpose, "simple text editor," "editor for editing structured documents," "WYSIWYG-type word processor" or the like are selectable in accordance with a progress in the creation of the patent documents.

To realize the above selection, environment setting items having shared data must include environment setting information representing a progress of the cooperative editing operation with a parameter. It is also necessary to add a step of evaluating the progress of the cooperative editing operation as a parameter.

<Contents Example of Environment Setting Items Including Progress as Parameter>

The stored environment setting items will be shown below. Herein, setting for a start-up menu of a word processor tool as the cooperative editing operation tool is extracted.

The example shows the setting of "word processor" in a "tool" menu of "Sessions" menu in the cooperative editing tool "CoEditTool." The setting shows that, for a progress level 1, a simple text editor "Emacs" is applied; for a progress level 2, an editor for structured document editing "Kobun-kun"; and for a progress level 3, a WYSIWYG-type high-performance word processor "EdittingStaffPRO."

```
. . .
behavior = {
  keyBinding = . . .
  mouseBinding = . . .
  menuBinding = . . .
    CoEditTool = {
      Sessions.tool.word_processor = {
        progress_level_1: Emacs;
        progress_lever_2: Kobun-kun;
        progress_level_3: EdittingStaffPRO;
      };
    };
  };
};
. . .
```

[Extended Selection Step]

Next, a selection step which includes a step of evaluating the progress level of the cooperative editing operation by using a parameter will be described.

Figure 14:
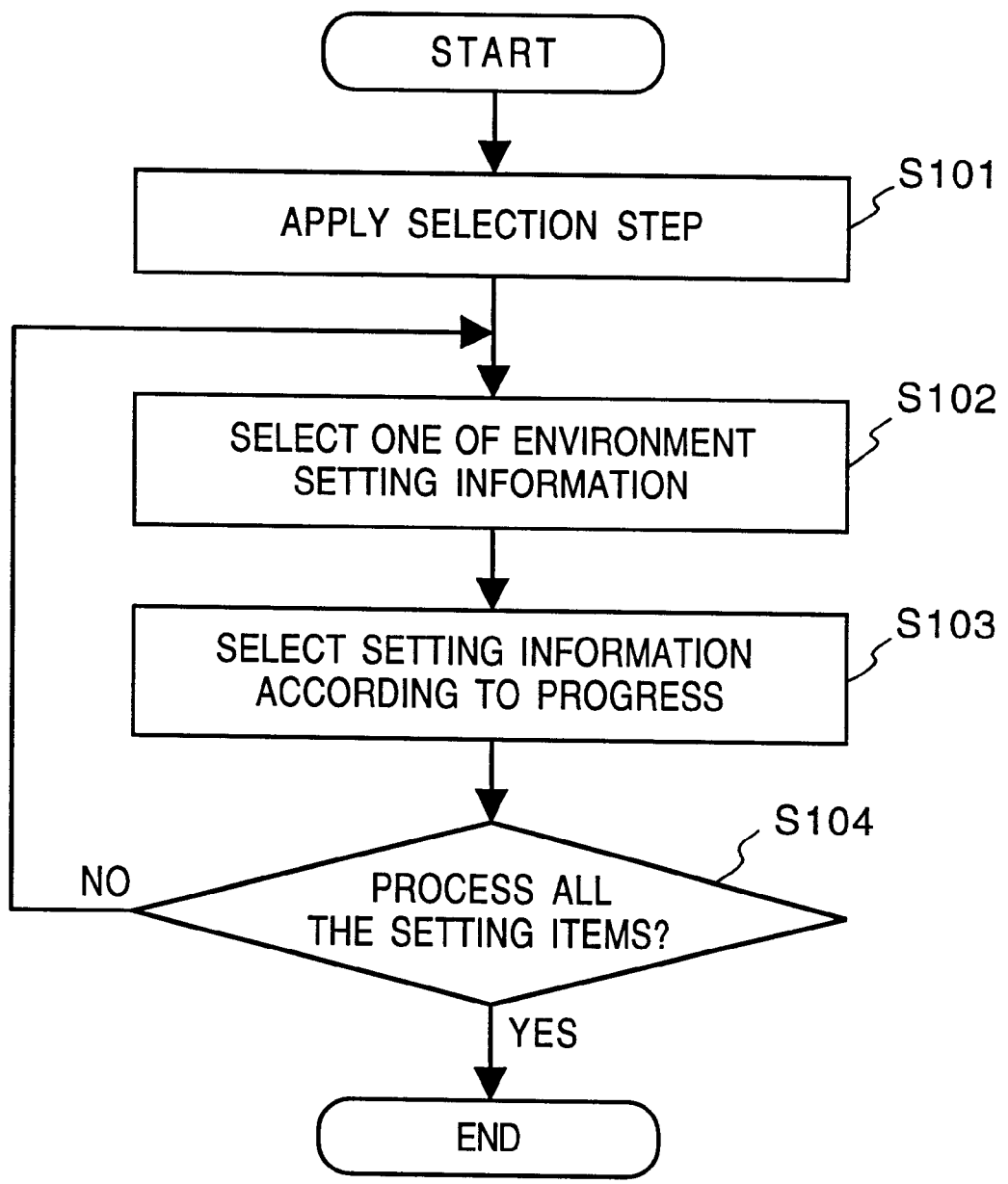
FIG. 14 is a flowchart showing an extended selection step according to a fourth embodiment.

Herein, the selection step is substituted by the following extended selection step (FIG. 14).

A selection step is applied (step S101).

Items of environment setting information is derived from the result of the selection step (step S102).

Setting information corresponding to the progress of the cooperative editing operation is selected for the derived items (step S103). More particularly, the progress levels 1 to 3 are selected as a parameter.

The steps S102 to S103 are repeated for all the setting items (step S104).

In the fourth embodiment, as a technique for reflecting the progress of the cooperative editing operation on an environment setting, a parameter of a group related to the cooperative editing operation is mapped to the environment setting at the selection operation step.

Aside from the above technique, the progress of the cooperative editing operation may be used to determine the group progress, and the group can be mapped to the environment setting according to the progress. In this case, the deriving step can be changed to include the step of evaluating the progress of the cooperative editing operation.

In the fourth embodiment, a description has been given on the example for flexible selection of the contents of the environment setting considering the situation of a cooperative operation. Similar description is applicable to a case where preference of users is considered. For instance, with regard to a simple text editor, various selection options may be prepared such as Emacs, vi or the like according to user's preference.

Further, in the fourth embodiment, discussion has been made for one situation of a cooperative operation, i.e. the progress of the cooperative operation. The discussion is also applicable to a situation generated by relationships with other cooperative operations. When a conflict occurs in environment settings, for instance, if a same background color is used among plural groups which simultaneously exist and distinguishing the groups becomes difficult, the environment setting is left flexible for a part of or all of the groups to avoid the conflict.

In the fourth embodiment, setting of a text editor as a document editing tool has been explained. Environment setting items that may have selection flexibility are: application software, layout, background, menu setting, access privilege, policy, which are similar to those items exemplified in the third embodiment.

Note that the present invention can be applied to a system constituted by a plurality of devices, or to an apparatus comprising a single device. Furthermore, the invention is applicable also to a case where the object of the invention is attained by supplying a program to a system or apparatus. In this case, the above described memory medium, in which the program according to the present invention is stored, constructs the present invention. By reading the program from the memory medium to a system or an apparatus, the system or the apparatus operates in a predetermined manner.

As has been described above, by each of the embodiments according to the present invention, a group environment setting method and system thereof can be provided which enables easy setting of a group operation environment or an application software when a cooperative operation is executed by a group consisting of plural persons on a computer. More particularly, a group environment setting method and system thereof can be provided which enables sharing of environment setting information for each group unit and enables flexible group identification by utilizing database and the like.

Moreover, the present invention provides a group environment setting method and system thereof which can easily set an operation environment, not only in a commonly-used cooperative operation environment using computers, but also in an exclusive cooperative operation environment (such as a television conference system) which utilizes a specific apparatus.

In other words, by setting an environment of a cooperative operation for each group unit, the following effects can be obtained for smoothly executing the cooperative operation.

(1) Labor required for setting environment can be reduced among those members who participate in a same cooperative operation;

(2) A consistent operation method can be obtained for members of a same group;

(3) Consistency can be maintained in an environment setting among members of a same group;

(4) A dynamically generated group can be supported;

(5) A flexible step of specifying a group is provided.

[Fifth Embodiment]

Fifth embodiment provides a user interface more realistic than before, and a mechanism which allows an easy operations by plural users who utilize a same resource.

<Idea of Environment Setting Method>

Figure 15:
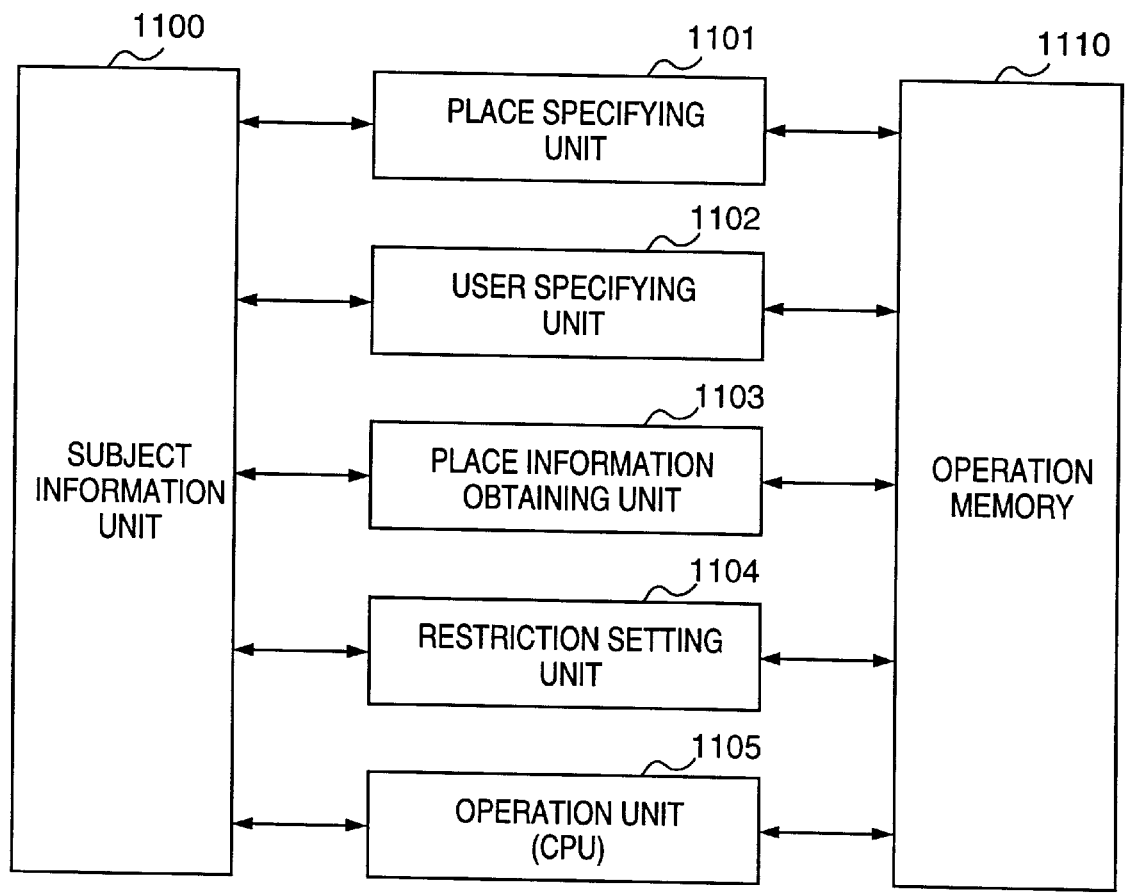
FIG. 15 is a block diagram showing a conceptual structure of an environment setting according to a fifth embodiment.

FIG. 15 shows a conceptual structure which realizes an environment setting method according to the fifth embodiment.

Reference numeral 1100 denotes subject information constituting subject information unit which serves as a memory for storing environment setting; and 1110, an operation memory for setting a necessary environment by referring to the subject information 1100. Reference numeral 1101 denotes a unit specifying portion for specifying a place to execute an operation or an operation to be subjected to; 1102, a user specifying unit for specifying a user or a user group who utilizes a tool or a program included in the present embodiment; 1103, a place-information obtaining unit for obtaining information related to a place; 1104, a restriction setting unit for setting necessary restrictions to the operation memory and a subject information space according to information accompanying the place; and 1105, an operation unit (CPU) for executing a main operation of the tool or program included in the present embodiment. Each of the units 1101 to 1105 is configured with a memory such as a ROM which stores a corresponding operation program for each unit. The CPU 1105 also executes the operation program.

The place specifying portion 1101 specifies a place where a program operation is executed or a subject place of an operation by utilizing information designated at the time of program start-up, environment variance of a user and information in the program-accessible subject information space, and stores the specified place in the operation memory. Similarly, the user specifying portion 1102 specifies a program user, or a user group in case where plural people utilize related programs, by referring to the information designated at the time of program start-up, environment variance of a user and the information in the program-accessible subject information space, and stores it in the operation memory.

The place-information obtaining portion 1103 searches database or the like utilizing the place information stored in the operation memory to obtain information such as restrictions which accompanies the subject place, a user, or the user's group, and stores the obtained information in the operation memory. The restriction setting portion 1104 sets information related to the program in the operation memory or in the subject information space by referring information stored in the operation memory, such as restrictions accompanying the place. The operation portion 1105 operates by referring to the information such as the restrictions set in the operation memory or subject information space.

Figure 16:
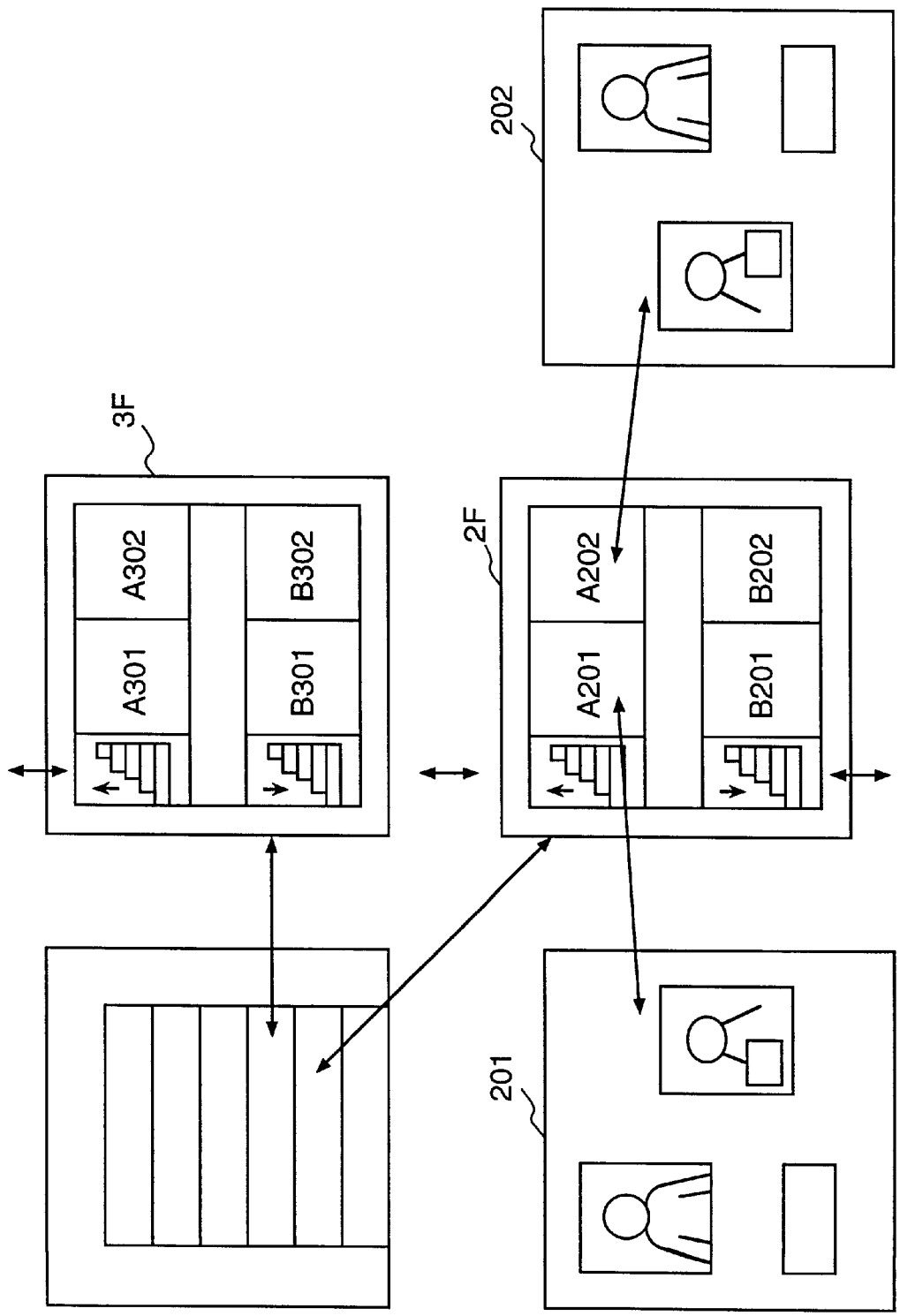
FIG. 16 is a conceptual view of an information space for directly illustrating an idea of a place.

FIG. 16 is a conceptual view of an information space for directly illustrating an idea of a place. As a program for searching (or browsing) information space expanding in a predetermined network, for example, Mosaic distributed by NCSA (National Center for Supercomputing Applications) in U.S. with source code and the like are provided.

In the example of FIG. 16, the second and third floors of a building including plural virtual meeting rooms (A201 to B302) are assumed; and by clicking a particular place with a pointing device such as a mouse, various places in the building can be viewed. If each of the meeting rooms is pointed, the information is unfolded to be displayed. Data-based upon such place or metaphor of a space can be easily generated by those who are skilled in the art. Note that such places can correspond to actual places.

Metaphors of such place provides an interface that is intuitively comprehensible by a user. However, there has been no frame provided for explicitly setting situational elements which can be easily identified by human, for example, ① a privacy is respected in a personal space but information is not concealed in public space; ② information disclosure among participants (normally group members who are involved with a common operation) is the principle, and there is no limitation for a manager of the group to enter the meeting room; ③ rules for assigning and accepting of an operation privilege employed by members with regard to a tool commonly utilized by the participants in the meeting room.

In the present embodiment, by explicitly utilizing an idea accompanying such place, it is possible to provide a user interface more realistic than before, and a mechanism which allows an easy operation by plural users who utilize a same resource, in accordance with an environment.

<Example of Group Conference System>

Figure 17:
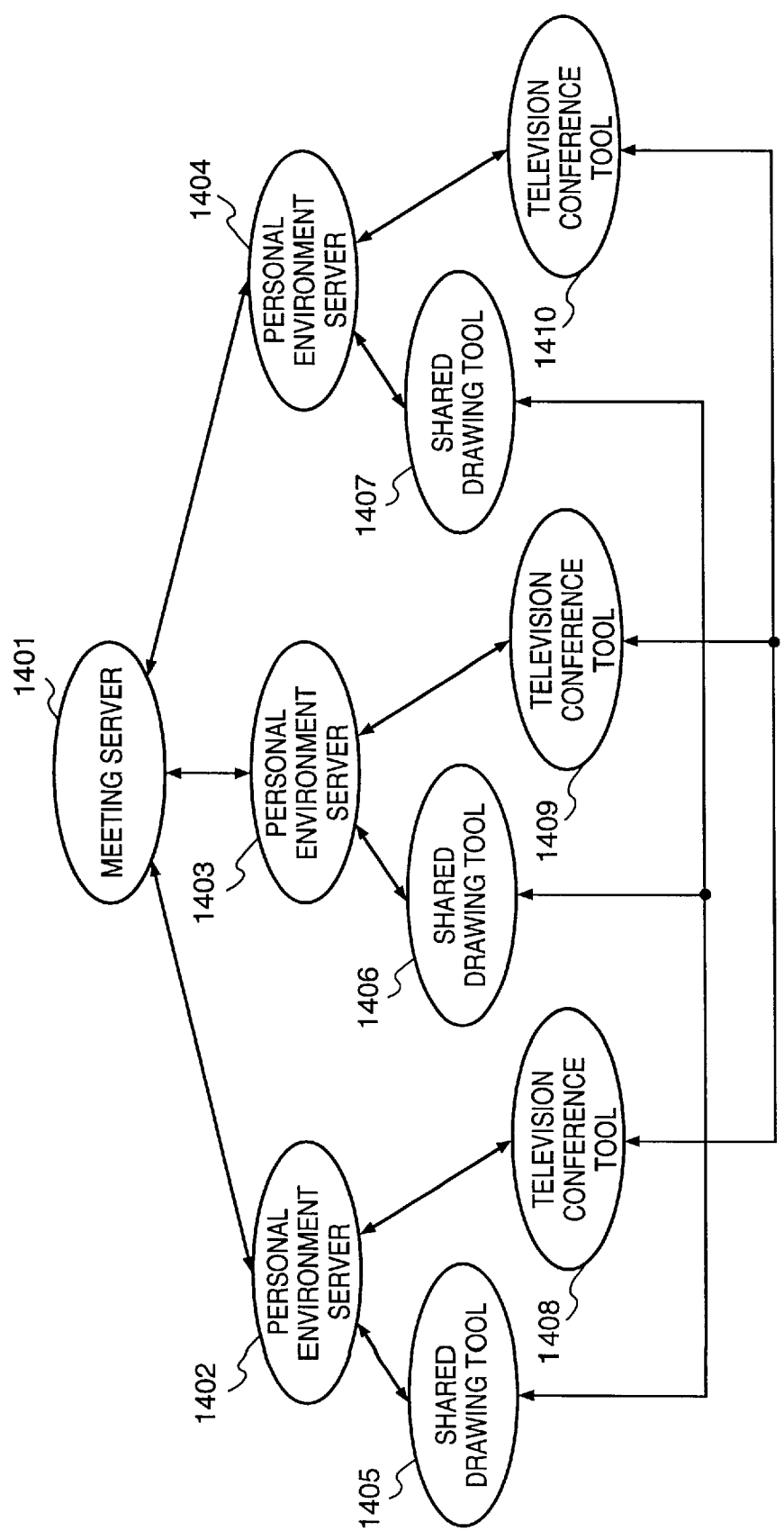
FIG. 17 is a structural view showing a process of a group conference system having the form of the fifth embodiment.

FIG. 17 shows a process structure of a group conference system according to the present embodiment.

Herein, reference numeral 1401 denotes a meeting server which manages an entire conference; 1402 to 1404, personal environment servers for managing environment of each users who participate in the conference; and 1405 to 1410, shared drawing tool and television conference tool applied in a personal environment.

The meeting server 1401 takes charge of a meeting that is to be held, and is started with designation of participants and a place of the meeting before the meeting starts. The personal environment servers 1402 to 1404 receive shared environment information necessary for carrying on the meeting and start necessary tools based on the information; in this example, the shared drawing tool and television conference tool are started. The shared drawing tools 1408 to 1410 transmit pictures and sound interactively. Note that some of the shared drawing tools or television conference tools are provided as PDS(Public Domain Software); therefore, utilization of the PDS can readily structure the shared drawing tools or television conference tools.

Figure 18:
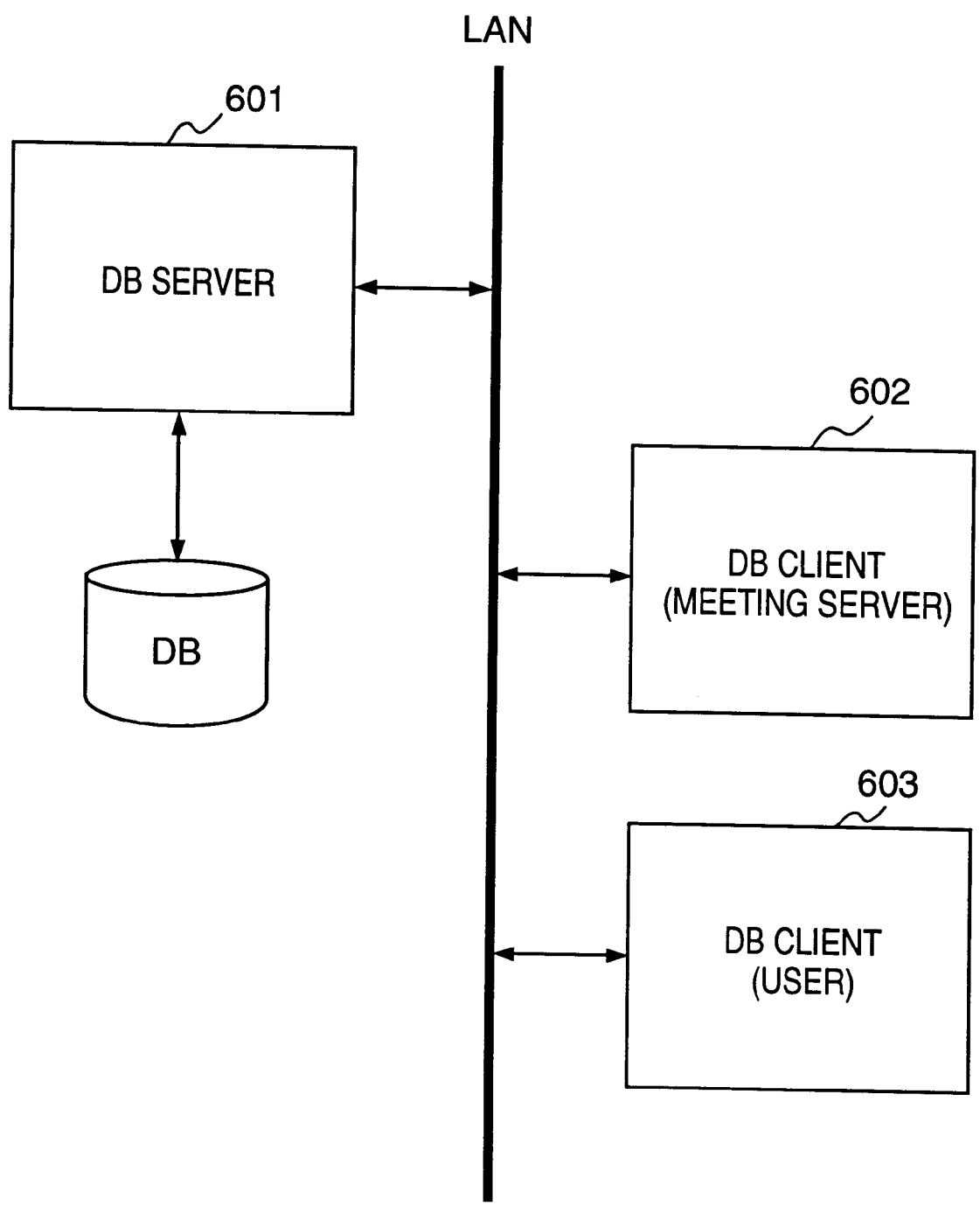
FIG. 18 is a structural view of an information space utilizing database.

Note that a general database may be employed as a meeting server in order to store various setting information utilized herein. In this case, as shown in FIG. 18, the meeting server 602 along with a user 603 are structured as a client of the database 601 (DB). Hereinafter, descriptions are given based on the exemplified structure of the database.

Figure 19:
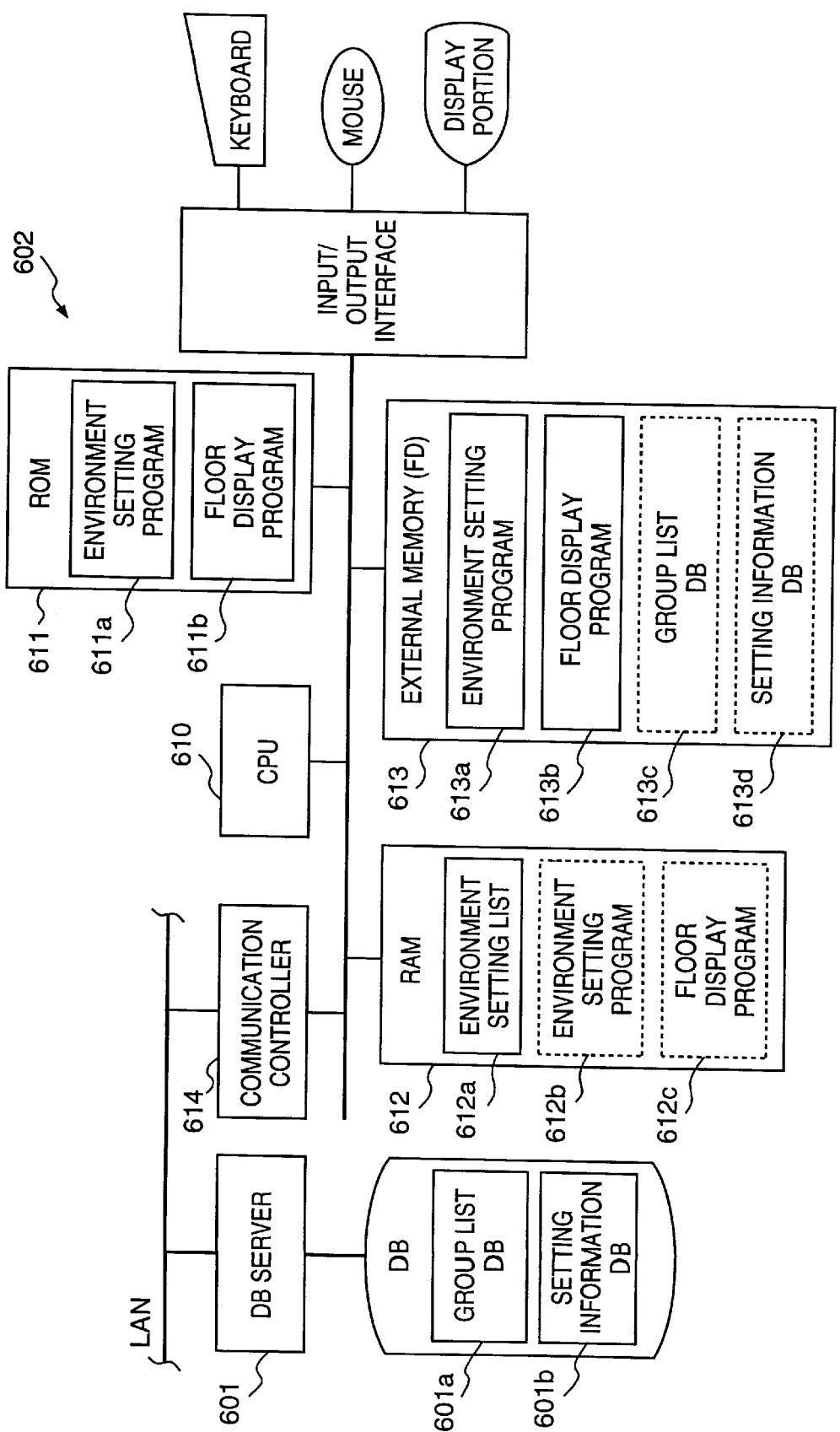
FIG. 19 is a structural view showing an example of structures of database or terminals serving as a meeting server according to the present embodiment.

FIG. 19 shows a structural example of the meeting server 602.

<Structural Example of Database>

A group list DB601a and setting information DB601b are stored in a database connected to the database server 601. For instance, the group list DB601a stores a group name (Gr. name) and members of the group (user 1, . . . , user n) in correspondence with a group number (Gr.) as shown in FIG. 20. Note that the form of storing is not limited to that of FIG. 20; group members may be stored in correspondence with each group.

The setting information DB601b has a structure such as shown in FIG. 21. The first column "Room" represents a place; and "Gr", a group to be utilized by. "Gr." has a special sign "*" which denotes non-designation. When no setting is available for a designated group, "*" is set. "UserClass" has five values: "Chair/Own" (a chairperson or a manager of a meeting), "Member" (members who participate in a meeting), "Manager" (superior person of a group), "Colleague" (members in a same organization), and "World" (persons outside the organization). The following columns set the attribute for each of the "UserClass". "Read/Peep" is a protection code for reading materials for a meeting or viewing the meeting, and three ranks can be set: "Good" (allowed), "Ask" (confirmation required), and "Nogood" (not allowed). "Write/Join" is a protection code related to writing to the meeting materials or participation to the meeting. "Meta-Write" is a protection code representing whether or not the protection code is allowed to be changed. "FloorPolicy" is a protection code related to obtaining of operation privileges, and "Automatic" (automatically obtained), "OnRequest" (explicitly requested) and the like are set.

Figure 22:
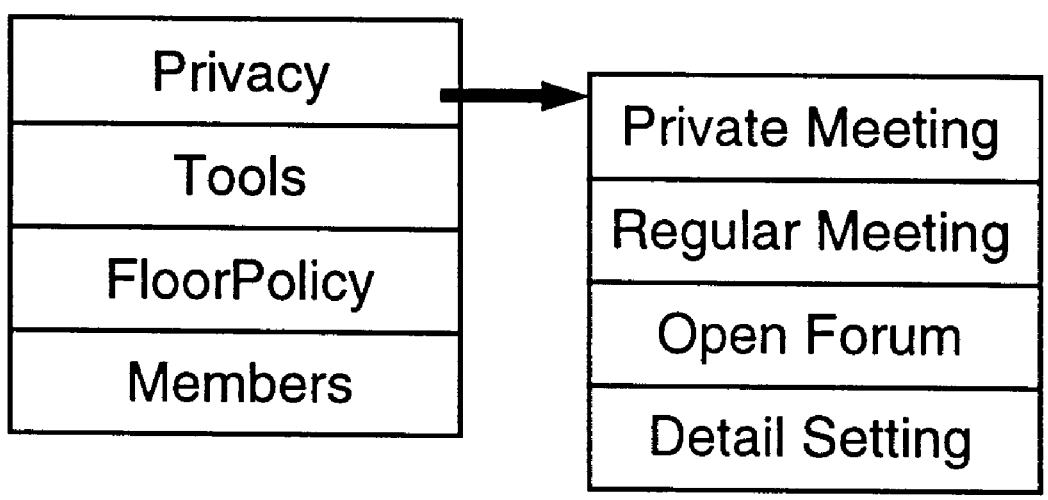
FIG. 22 is a diagram showing one example of setting information for a conference stored in database.

The setting information in FIG. 21 gives default setting when a meeting starts; however, a chairperson of the meeting may explicitly change the setting. FIG. 22 shows a menu for changing the set information. "Privacy" (protection code), "Tools" (a group of tools to start-up, e.g. the television conference tool and shared drawing tool), "Floor-Policy" (protection code related to assignment of operation privilege), "Members" (participants of a meeting) and the like are provided. Further, with respect to a protection code, "Private Meeting" (access privilege given only to "Chair" and "Member"), "Regular Meeting" (access privilege given to "Chair", "Member", "Manager", "Colleague"), or "Detail Setting" (separate setting) are selectable as sub-menu of the "Privacy". The above described menu is readily structurable utilizing a general window system and as a result of the operation, contents of the operation memory is updated.

<Example Structure of Meeting Server Terminals>

Referring to FIG. 19, reference numeral 610 denotes a CPU for calculating and controlling which controls the meeting server terminals; and 611, a ROM for storing fixed data and programs having an environment setting program 611*a* and a floor display program 611*b* according to the present embodiment. Reference numeral 612 denotes a RAM which serves as an operation memory, and stores an environment setting list 612*a* obtained by environment setting; and 613, an external memory such as a floppy disc, CD, MO or the like. Environment setting according to the present embodiment may be realized by storing an environment setting program 613*a* and a floor display program 613*b* and loading them to areas 612*b* and 612*c* of the RAM 612. Furthermore, the group list DB601*a* and setting information DB601*b* can be stored in the external memory 613 to create a database in the meeting server terminal.

Reference numeral 614 is a communication controller for communicating with the DB server 601 and user terminals via the LAN. A Key board, mouse, and a display portion are connected via an input/output interface.

<Example Structure of User Terminals>

Figure 23:
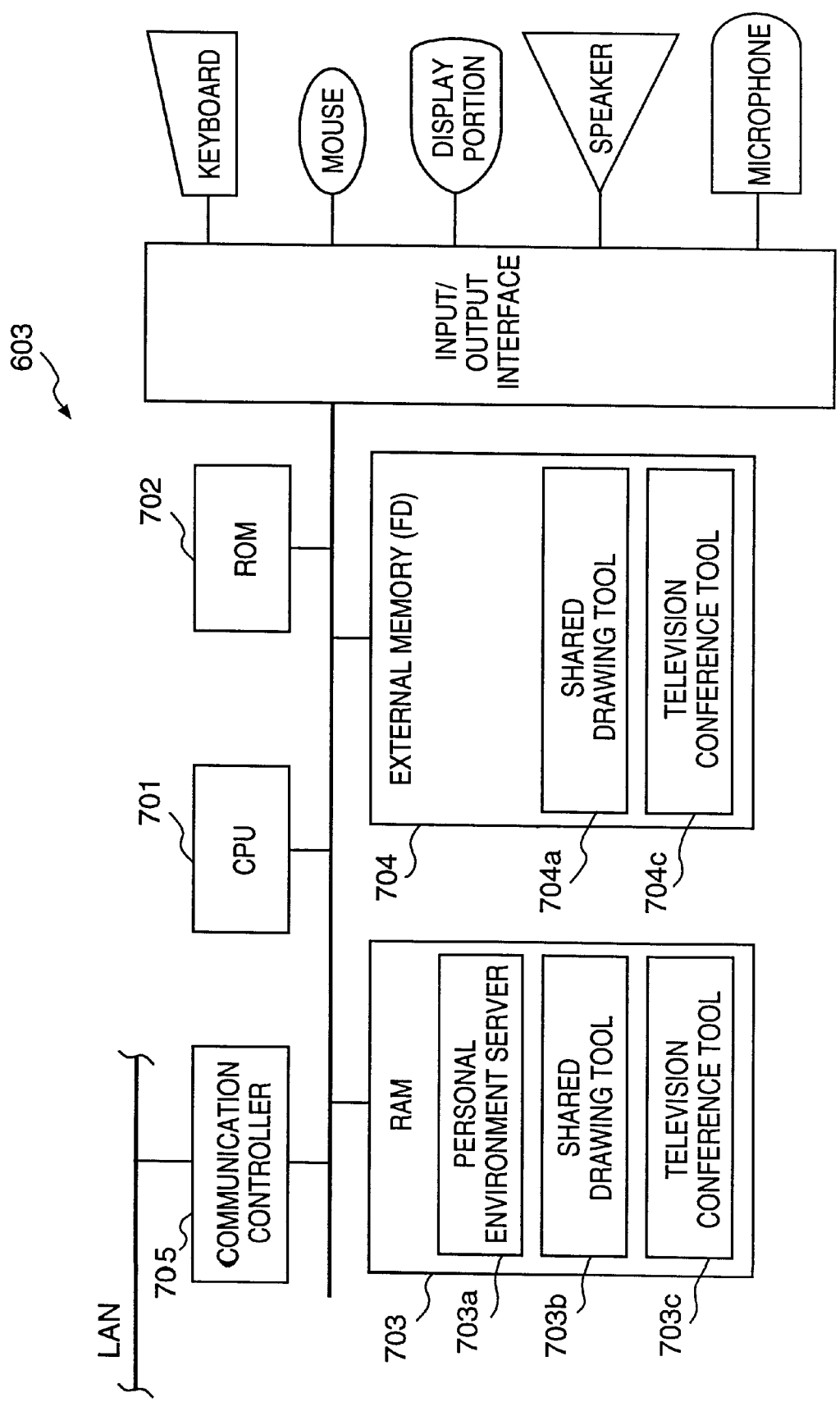
FIG. 23 is a block diagram showing menus for changing set information.

FIG. 23 shows an example structure of the user terminal 603.

Reference numeral 701 denotes a CPU for calculating and controlling which controls the user terminals; and 702, a ROM for storing fixed data and programs. Reference numeral 703 denotes a RAM serving as an operation memory, which stores a personal environment server 703*a* of the user terminals according to environment information set by a meeting server, and further, in this example, stores areas 703*a* and 703*b* for loading and executing a shared drawing tool 704*a* and a television conference tool 704*b* stored in an external memory 704. Reference numeral 705 denotes a communication controller for communicating with the DB server 601 and meeting server terminals via the LAN. Moreover, a key board, mouse, a display portion, a speaker and microphone are connected via an input/output interface.

<Operation Example of Meeting Server>

Figure 24:
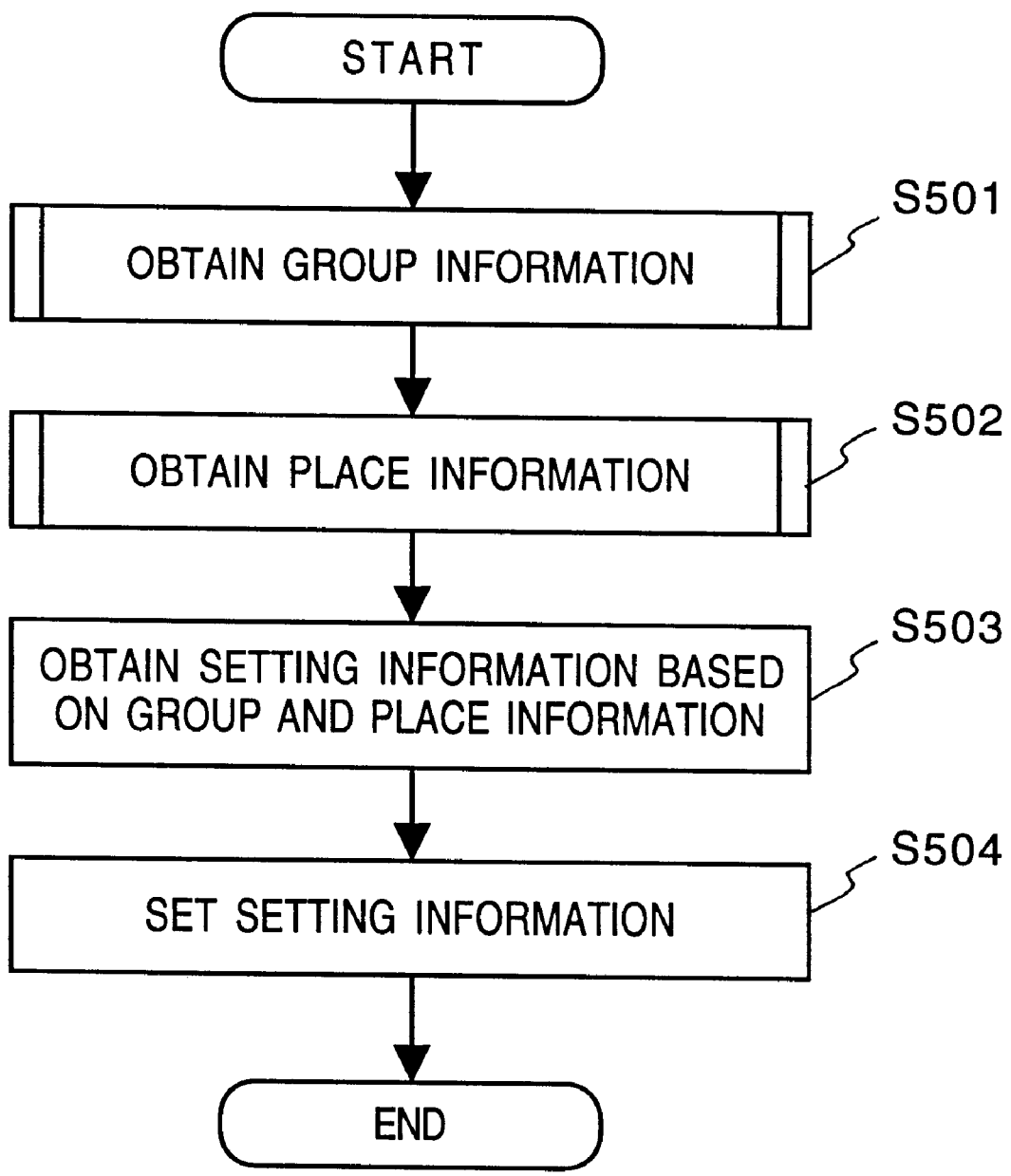
FIG. 24 is a flowchart showing an example of an operation step at a terminal serving as a meeting server.

FIG. 24 shows steps of an operation example of the meeting server 1401. In step S501, information is obtained regarding a group participating a meeting. In step S502, information is obtained regarding a (virtual) place where the meeting is held. In step S503, setting information is obtained based on the group and place information for obtaining setting information related to a meeting such as: ① setting of an access privilege (protection code for a file) for data to be generated, ② setting of a privacy protection setting related to a video conference (such as allowance of limited attendants), ③ rules for assigning a chairperson privilege or an operation privilege in a cooperative operation tool. In step S504, it is set so that the program can apply the above setting information.

The meeting server 1401 obtains conditions of meeting setting by steps S501 and S502. In step S503, setting information is obtained according to the obtained group and place information. It is then set in step S504 such that the program can apply the setting information. With the above process, environment elements required for managing and executing a meeting can be applied.

Figure 25:
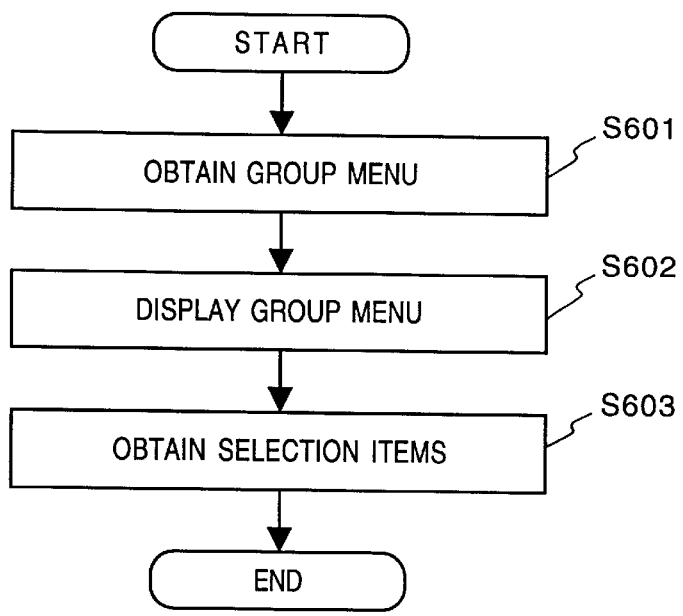
FIG. 25 is a flowchart showing an acquiring step of group information at step S501 in FIG. 24.

FIG. 25 shows steps of S501 further in detail. In step S601, a registered group list (see FIG. 20) is obtained; in step S602, the obtained group list is displayed as a group menu; in step S603, a group selected by a user is obtained from the displayed menu; and the process of step S501 in which a selected group is stored in the operation memory and group information is obtained, is completed.

Figure 26:
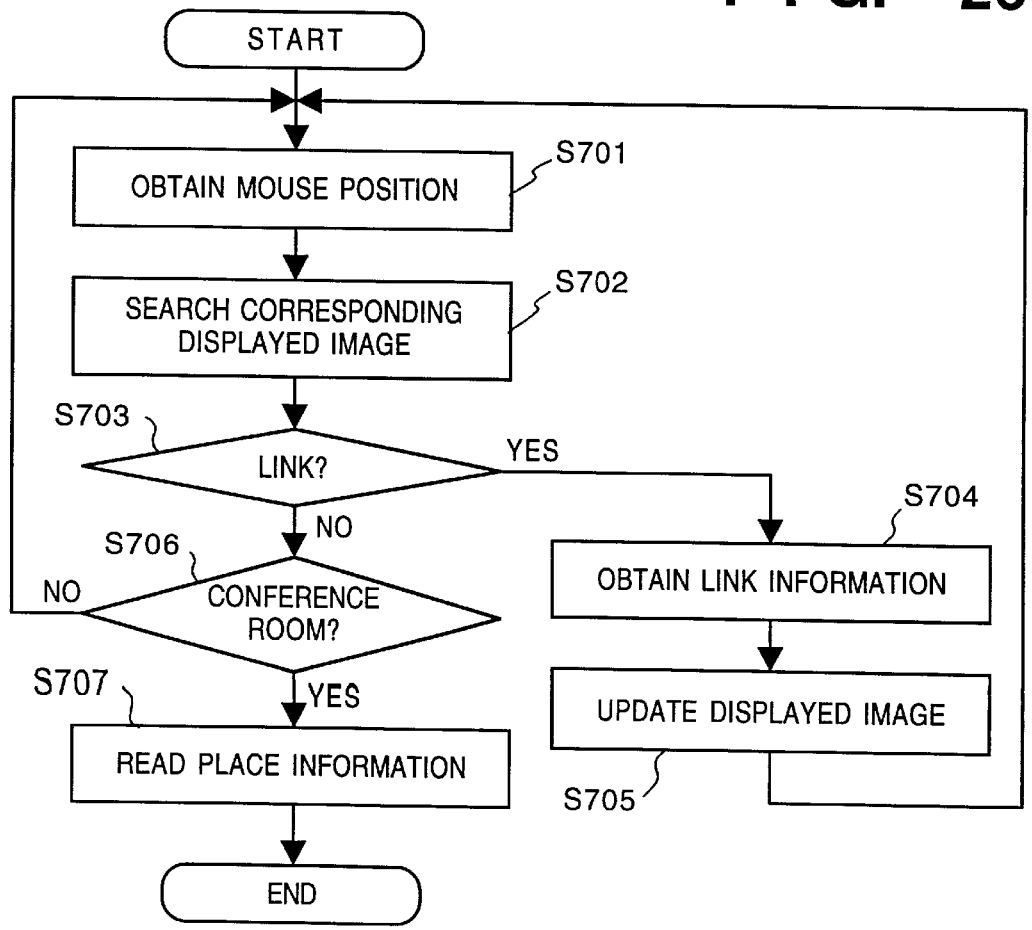
FIG. 26 is a flowchart showing an acquiring step of place information at step S502 in FIG. 24.

FIG. 26 shows steps of S502 further in detail. Herein, a user interface process utilizing a displayed image as shown in FIG. 16 will be described. This can be also realized by a form of a listed menu, or by requesting direct inputting of texts from a user.

In step S701, a position on a displayed image designated by a mouse position or an input event by a mouse button action are obtained. In step S702, a subject corresponding to the designated position of the mouse is searched on the displayed image. Herein, each of the subjects in the displayed image has a list of a selection subject boundary, such as: subject S: $150 \approx x \leq 200$, $100 \leq y \leq 150$. By comparing the list and the designated position of the mouse, the subject is searched. For subjects, there are a conference room, links, and so on. In step S703, it is determined whether or not the designated subject is linked; and if it is, the process proceeds to step S704; but if it is not, the process proceeds to step S706 where a linked map is obtained. In step S705, a given displayed image is displayed, the displayed image is updated, and the process returns to step S701 to wait for another user's designation.

In step S706, it is determined whether or not it is a conference room; and if it not a conference room the process awaits for another user's designation. If it is a conference room, a place in the conference room for the designated subject is read from a database to be stored in the operation memory and the process ends.

As described above, the meeting server 1401 performs an appropriate environment setting according to a place of the conference to be held and a participating group, and enables conversation with appropriate users with the shared drawing tools 1405 to 1407 as well as the television conference tools 1408 to 1410. Accordingly, each member can obtain a common environment setting which enables a smooth group operation without setting an environment setting on individual basis.

Note that from a customization point of view for a user's environment, besides those described above: ① setting of an access privilege (protection code for files) related to data generation, ② setting of privacy protection for video conference (allowance of limited participants), ③ rules for assigning a chairperson privilege or an operation privilege in a cooperative operation tool, the following elements are also possible to set in a similar manner as setting contents.

④ Application software

In order to assure exchangeability of data, a drawing tool or a document editor utilized in a group are shared. Even for a same type of data, a type of an operation tool is switched depending on whether if it is for an editing group or a presentation group.

⑤ Display layout

Usage such as "clock is placed at the top left corner and windows shown as icons are arranged at the bottom of the display" is set to be shared within a group. For a window of a specific application such as a group meeting, a same background is utilized in a group.

⑥ Background

A same background is displayed for each group. This enables a person to change his/her mood when his/her work involves with plural groups.

⑦ Setting Menu

Even in a case where a same user uses a same application, it is set such that contents of a menu is changed depending on for which operation the application is used.

[Sixth Embodiment]

Hereinafter, the sixth embodiment of the present invention will be described. In the sixth embodiment, a remote camera system which is capable of viewing various situations utilizing cameras distributed in various locations in an office, by having place information correspond to an actual place, will be described.

Figures 27, 28:
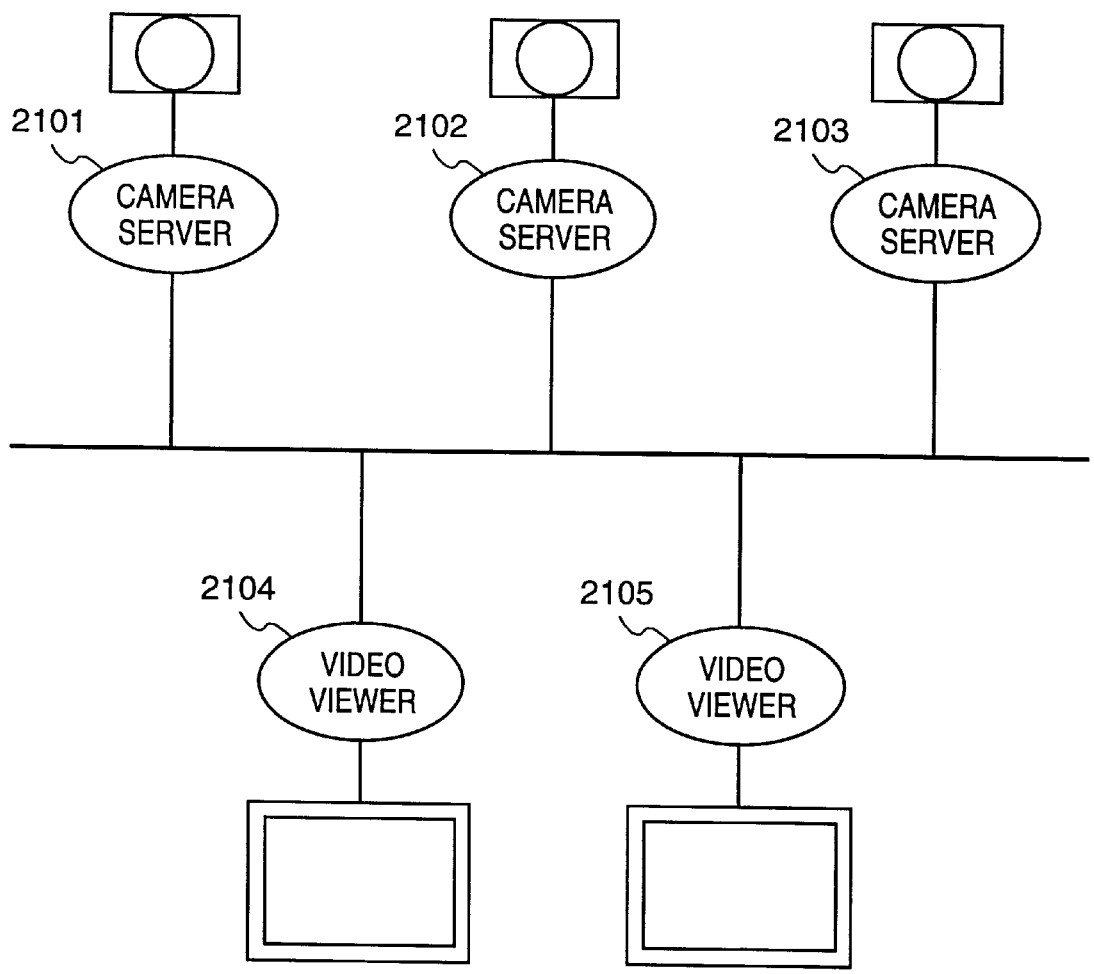
FIG. 27 is a structural view of a process in an operation system of remote cameras including the including the form of present embodiment.
FIG. 28 is a diagram exemplifying a part of database showing correspondences of a place and a camera.

FIG. 27 shows a process structure of an operation system of remote cameras according to the sixth embodiment. Herein, each of reference numerals 2101 to 2103 denotes a camera server which operates and manages a camera; and 2104 to 2105, video viewers for viewing pictures sent from the cameras. Herein, the present invention is applied to both the camera server and video viewer.

Similar to the fifth embodiment, a database server (not shown) connected via LAN or the like has a database such as protection codes related to each place of an office. Note that places correspond to actual places. The database server also includes a database which shows correspondences between places and cameras. FIG. 28 exemplifies a part of the database which shows correspondences between places and cameras.

The method of applying video viewers will be explained first. A brief flow of an operation of the video viewers corresponds to the flowchart in FIG. 29. More specifically, the video viewers are started by a specific user or a user group.

In this case, group information is obtained by user information being stored in the operation memory at the time of start-up. The user then points on a displayed image with a pointing device such as a mouse to designate a place to view. Details of this step is similar to the step of obtaining a subject from a displayed image shown in FIG. 26. The video viewer derives setting information related to a place stored in the database such as the one shown in FIG. 21 from a user information or a place information. By using the information, it is determined whether or not a viewable camera at the subject place is operable.

Figure 29:
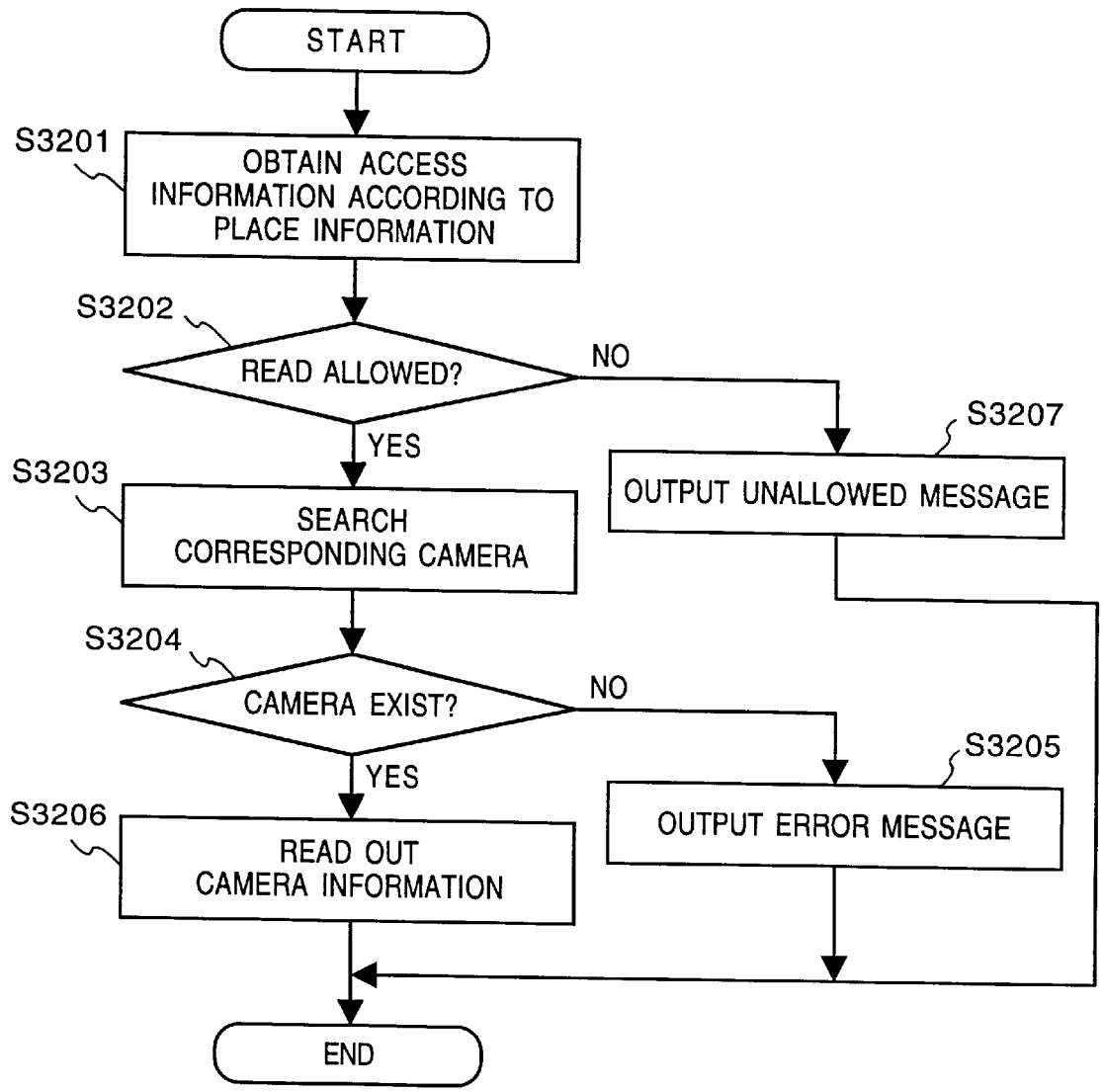
FIG. 29 is a flowchart showing a step of acquiring setting information in which setting information is derived from place information and user information to be viewed.

FIG. 29 shows an obtaining step of setting information for deriving setting information from the place information or user information representing a place to be viewed.

A video viewer program obtains protection codes or the like for accessing a place to be viewed in step S3201, and determines in step S3202 whether or not viewing is allowed. If viewing is not allowed, a message conveying non-allowance is outputted in step S3207 and the process ends. If viewing is allowed, a camera located at the subject place is searched in step S3203. The corresponding relationship between cameras and places are stored in a database with a form of a correspondence table shown in FIG. 28. By searching the table, a camera is searched. In step S3204, it is determined from the search result whether or not there is a viewable camera to view the subject place, and if there is no camera, an error message is outputted in step S3205 and the process ends. If there is a camera available, information necessary to access the camera (such as a communication port to the camera server) is obtained from the database in step S3206, store it in the operation memory and the process ends.

Meanwhile, the camera server proceeds to an operation step where, at the time of start-up, access information is obtained from the aforementioned database according to information of a user range (normally a group using that place) and set place, stores them in the operation memory, and provides camera pictures according to a request from a Viewer program.

By the above configuration, environment setting has become easy in the following points.

In the idea of controlling and managing of a camera, setting of who has what access privilege is unclear and is confusing. By providing a concrete image of a subject, that is, a place, to set a protection code, privacy protection is possible.

When a place can be viewed by plural cameras, integral and adjustable privacy protection is possible. In addition, setting is centralized, therefore, becomes easy.

Note that the present invention can be applied to a system constituted by a plurality of devices or to an apparatus comprising a single device. Furthermore, the invention is applicable also to a case where the object of the invention is attained by supplying a program to a system or apparatus. In this case, the above described memory medium, in which the program according to the present invention is stored, constructs the present invention.

As has been described, the present invention can provide an environment setting method and system thereof for effectively realizing operation executed in a group or privacy protection among individuals within a group, by extending an idea of a "place" to describe a group situation and by explicitly identifying and applying existing rules, conditions or agreements. Further, a cooperative operation can be smoothly executed by virtue of flexible environment setting for the cooperative operation. Moreover, utilization of an abstract idea of a "place" provides such effects that privacy protection is possible and centralized setting is possible for plural access channels provided with plural cameras and the like.

In other words, the present invention provides an environment setting method and system thereof which can easily set an operation environment for programs in a network environment where plural computers are connected. In addition, an environment setting method and system thereof is provided which enables easy setting of an operation environment for programs in accordance with information about an operation subject or an operation place and information about a user or the user's group. Further, setting an program operation environment becomes easy and more particularly, environment setting method and system thereof is provided which can easily manage the operation environment by centralizing information to be set. Still further, a conference system where a conference is held with the use of plural computers connected via a network can be provided, which can easily set an environment in accordance with information about an operation subject or an operation place and information about a user or the user's group. Still further, a camera control system structured by plural computers connected via a network, or camera modules of which communication is controllable, is provided, which can easily set an environment particularly in accordance with viewing subject and viewers, or information about the viewers' group.

The present invention can be applied to a system constituted by a plurality of devices, or to an apparatus comprising a single device.

Further, the object of the present invention can also be achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further the storage medium, such as a floppy disc, hard disc, an optical disc, a magneto-optical disc, CD-ROM, CD-R, a magnetic tape, a non-volatile type memory card, and ROM can be used to provide the program codes.

In addition to the aforesaid functions according to the above embodiments which are realized by executing the program codes and read by a computer, the present invention accommodates the case where an OS(operating system) or the like working on the computer, performs a part or entire processes in accordance with designations of the program codes and realizes functions according to the above embodiments.

As many apparently widely different embodiments of the present invention can be made without departing from the spirit and scope thereof, it is to be understood that the invention is not limited to the specific embodiments thereof except as defined in the appended claims.

The present invention is not limited to the above embodiments and various changes and modifications can be made within the spirit and scope of the present invention. Therefore, to appraise the public of the scope of the present invention, the following claims are made.

What is claimed is:

1. A group environment setting method in a network system consisting of plural computers where plural participants constitute a group and perform a cooperative operation, comprising the steps of:

registering environment setting information for setting an application environment for the cooperative operation according to a group;

reading, when a group is designated by a participant, environment setting information corresponding to the designated group from said registered environment setting information;

applying the read environment setting information as environment setting information of said participant who designated the group; and notifying other participants of the read environment setting information so that an equivalent application environment is set for all participants of the designated group before each participant performs the cooperative operation.

2. The group environment setting method according to claim 1, wherein said environment setting information includes plural environment setting items.

3. The group environment setting method according to claim 2, wherein said registering of environment setting information is executed in a hierarchical structure; and wherein information satisfying given conditions are selected from the read plural hierarchies of environment setting information for each of the environment setting items.

4. The group environment setting method according to claim 3, wherein said hierarchical structure is a multi-information hierarchical structure in which components of the hierarchy include environment setting information for a group unit and environment setting information for an individual unit.

5. The group environment setting method according to claim 3, wherein said given conditions include designation of an inheriting relationship in which environment setting items of an upper hierarchy is inherited by a lower hierarchy.

6. The group environment setting method according to claim 3, wherein said given conditions include designation of an inheriting relationship distinguishable as to whether or not the environment setting items are to be inherited among hierarchies.

7. The group environment setting method according to claim 6, wherein said designation of the inheriting relationship can be set for each hierarchy.

8. The group environment setting method according to claim 3, wherein said environment setting information is registered as a database or a structured document in a file system.

9. The group environment setting method according to claim 8, wherein said document is structured in accordance with Standard Generalized Markup Language (ISO 8879).

10. The group environment setting method according to claim 1, wherein a set of contents of the cooperative operation and a group is registered in advance so that the group can be uniformly specified from contents of cooperative operation.

11. The group environment setting method according to claim 10, wherein said contents of the cooperative operation are applications which include television conference or cooperative editing operation; and wherein a set of applications and a group are registered in advance so that a group utilizing a certain application can be determined.

12. The group environment setting method according to claim 1, wherein said environment setting information includes a data access privilege for generation or reading of data related to the cooperative operation.

13. The group environment setting method according to claim 12, wherein said access privilege is designated as:

"none": nothing is allowed;

"readonly": only reading is allowed;

"appendable": no change is allowed but additions of items are allowed;

"insertable": no change in each item is allowed, but additions and changes in the relationship among items are allowed;

"updatable": changes in each item and relationship among items are allowed; and

"deletable": deletion is allowed.

14. The group environment setting method according to claim 1, wherein said environment setting information includes information for privacy protection such as allowance of limited attendants.

15. The group environment setting method according to claim 1, wherein said environment setting information includes rules for assigning a chairperson privilege or an operation privilege in a cooperative operation tool and the like.

16. The group environment setting method according to claim 1, wherein said environment setting information includes operation information such as specification of an operation corresponding to a mouse button, menu contents for mouse operation, or warning sound during a cooperative operation.

17. The group environment setting method according to claim 1, wherein said environment setting information includes display information which can identify a group.

18. The group environment setting method according to claim 17, wherein said display information includes any of colors for displaying a mouse cursor, colors for displaying mouse operation menu, screen display modes for participants of a cooperative operation, background filling patterns for screens of participants, frame filling patterns for screens of participants, or frame colors for screens of participants.

19. The group environment setting method according to claim 1, wherein said environment setting information includes information for plural applications utilized in various processes of the cooperative operation,
further comprising the steps of selecting an application corresponding to a process for the cooperative operation from said plural applications and applying as environment setting information of said participant.

20. The group environment setting method according to claim 1, wherein a predetermined part of the environment setting information applied by said participant is redundantly stored and selection of environment setting information is left flexible.

21. A computer network system for cooperatively performing an operation by plural participants constituting a group, comprising:
registering means for registering environment setting information for setting an application environment for the cooperative operation according to a group;
reading means for, when a group is designated by a participant, reading environment setting information corresponding to the designated group from said registered environment setting information;
applying means for applying the read environment setting information as environment setting information of said participant who designated the group; and
notifying means for notifying other participants of the read environment setting information so that an equivalent application environment is set for all participants of the designated group before each participant performs the cooperative operation.

22. The system according to claim 21, wherein said environment setting information includes plural environment setting items.

23. The system according to claim 21,
wherein said registering means registers said environment setting information in a hierarchical structure; and
wherein said applying means includes selection means for selecting information satisfying conditions given by the read plural hierarchies of environment setting information for each of the environment setting items.

24. The system according to claim 23, wherein said hierarchical structure is a multi-information hierarchical structure in which components of the hierarchy include environment setting information for a group unit and environment setting information for an individual unit.

25. The system according to claim 23, wherein said given conditions include designation of an inheriting relationship in which environment setting items of an upper hierarchy is inherited by a lower hierarchy.

26. The system according to claim 23, wherein said given conditions include designation of an inheriting relationship distinguishable as to whether or not the environment setting items are to be inherited among hierarchies.

27. The system according to claim 26, wherein said designation of the inheriting relationship can be set for each hierarchy.

28. The system according to claim 23, wherein said registering means registers said environment setting information as a database or a structured document in a file system.

29. The system according to claim 28, wherein said structured document is structured in accordance with Standard Generalized Markup Language (ISO 8879).

30. The system according to claim 21, further comprising:
second registering means for registering a set of contents of a cooperative operation and a group in advance so that the group can be uniformly specified from contents of a cooperative operation.

31. The system according to claim 30, wherein said contents of the cooperative operation are applications which include television conference or cooperative editing operation.

32. The system according to claim 21, wherein said environment setting information includes a data access privilege for generation or reading of data related to the cooperative operation.

33. The system according to claim 32, wherein said access privilege is designated as:
"none": nothing is allowed;
"readonly": only reading is allowed;
"appendable": no change is allowed but additions of items are allowed;
"insertable": no change in each item is allowed, but additions and changes in the relationship among items are allowed;
"updatable": changes in each item and relationship among items are allowed; and
"deletable": deletion is allowed.

34. The system according to claim 21, wherein said environment setting information includes information for privacy protection such as allowance of limited attendants.

35. The system according to claim 21, wherein said environment setting information includes rules for assigning a chairperson privilege or an operation privilege in a cooperative operation tool and the like.

36. The system according to claim 21, wherein said environment setting information includes operation information such as specification of an operation corresponding to a mouse button, menu contents for mouse operation, or warning sound during a cooperative operation.

37. The system according to claim 21, wherein said environment setting information includes display information which can identify a group.

38. The system according to claim 37, wherein said display information includes any of colors for displaying a mouse cursor, colors for displaying mouse operation menu, screen display modes for participants of a cooperative operation, background filling patterns for screens of participants, frame filling patterns for screens of participants, or frame colors for screens of participants.

39. The system according to claim 21,
wherein said environment setting information includes information for plural applications utilized in various processes of the cooperative operation,
wherein said application means further selects an application corresponding to a process for the cooperative operation from said plural applications and applies as environment setting information of said participant.

40. The system according to claim 21, further comprising:
storing means for redundantly storing a predetermined part of the environment setting information applied by said participant; and
instructing means for leaving flexibility in selection of environment setting information.

41. An environment setting method of setting an operation environment of a program in a network environment where plural computers are connected thereto, comprising the steps of:

storing setting information of an operation environment in correspondence with an idea of a virtual place where the operation is executed;

designating a virtual place to obtain setting information; and setting the operation environment of a program to plural computers in the designated virtual place by utilizing said setting information so that an equivalent operation environment of a program is set for all computers in the designated virtual place before each of the computers is operated in a cooperative operation.

42. The setting method in a network environment according to claim 41, wherein memory of said setting information is linked to a user or a user's group; and wherein setting information is obtained in accordance with said place and said user or user's group.

43. The environment setting method according to claim 42, further comprising the step of changing said setting information.

44. An environment setting method of setting an operation environment of a program in a network environment where plural computers are connected thereto, comprising the steps of:

storing setting information of an operation environment in correspondence with a place where the operation is executed;

specifying a place where an operation is executed;

obtaining environment setting information according to said specified place from the stored setting information; and setting the operation environment of the program to plural computers in said specified place utilizing said obtained environment setting information so that an equivalent operation environment of a program is set for all computers in said specified place before each of the computers is operated in a cooperative operation.

45. An environment setting method of setting an operation environment of a program in a network environment where plural computers are connected thereto, comprising the steps of:

storing setting information of an operation environment in correspondence with a place where the operation is executed;

specifying a user or user's group who executes an operation;

specifying a place where an operation is executed;

obtaining environment setting information from the stored setting information according to said specified place; and setting the operation environment of the program to plural computers in said specified place utilizing said obtained environment setting information so that an equivalent operation environment of a program is set for all computers in said specified place before each of the computers is operated in a cooperative operation.

46. An environment setting system which performs setting an operation environment of a program in a network environment where plural computers are connected thereto, comprising:

storing means for storing setting information of the operation environment in correspondence with an idea of a virtual place where the operation is executed;

place designating means for setting an idea of a virtual place and designating a virtual place where the operation is executed;

setting information obtaining means for obtaining environment setting information according to said designated virtual place; and operation environment setting means for setting an operation environment of a program to plural computers in the designated virtual place by utilizing said environment setting information obtained by said setting information obtaining means so that an equivalent operation environment of a program is set for all computers in said specified place before each of the computers is operated in a cooperative operation.

47. The environment setting system according to claim 46, further comprising:

user designating means for designating a user or a user's group, wherein said setting information obtaining means obtains environment setting information in correspondence with said place and said user or user's group.

48. The environment setting system according to claim 46, wherein said storing means includes a database having environment setting information accompanying each of the place.

49. The environment setting system according to claim 47, wherein said idea of a virtual place corresponds to an actual place.

50. An environment setting system which performs setting of an operation environment of a program in a network environment where plural computers are connected thereto by reading predetermined data from a storing medium, wherein said storing medium stores setting information of an operation environment in correspondence with a user or user's group and an idea of a virtual place where the operation is executed, said environment setting system utilizing said setting information read out from said storing medium so that a same operation environment of a program is set for all computers in said virtual place before each of the computers is operated in a cooperative operation.

51. An environment setting system which performs setting of an operation environment of a program in a network environment where plural computers are connected thereto by reading predetermined data from a storing medium, wherein said storing medium stores:

an operation code for designating a user or user's group who executes an operation;

an operation code for designating a place where an operation is executed;

an operation code for obtaining environment setting information from the stored predetermined data according to said place; and an operation code for setting the operation environment of the program to plural computers in said space utilizing said obtained environment setting information so that an equivalent operation environment of a program is set for all computers in said place before each of the computers is operated in a cooperative operation.

52. A conference system, where a meeting is held, utilizing plural computers connected in a network, comprising a meeting management program having the environment setting system described in claim 47 as a component.

53. A camera control system consisting of plural computers connected via a network or communication-controllable camera modules, having the environment setting system according to claim 50 as a component.

54. An environment setting system which performs setting of an operation environment of a program in a network environment where plural computers are connected thereto, comprising:

storing means for storing setting information of an operation environment in correspondence with a place where the operation is executed;

specifying means for specifying a place where an operation is executed;

obtaining means for obtaining environment setting information according to said specified place from the setting information stored in said storing means; and setting means for setting the obtained operation environment of the program to plural computers in the specified space by utilizing said obtained environment setting information so that an equivalent operation environment of a program is set for all computers in said specified place before each of the computers is operated in a cooperative operation.

55. An environment setting system which performs setting of an operation environment of a program in a network environment where plural computers are connected thereto, comprising:

storing means for storing setting information of an operation environment in correspondence with a place where the operation is executed;

first specifying means for specifying a user or user's group who executes an operation;

second specifying means for specifying a place where an operation is executed;

obtaining means for obtaining environment setting information according to said specified place from the setting information stored in said storing means; and setting means for setting the obtained operation environment of the program to plural computers in said specified place by utilizing said obtained environment setting information so that an equivalent operation environment of a program is set for all computers in said specified place before each of the computers is operated in a cooperative operation.

* * * * *

UNITED STATES PATENT AND TRADEMARK OFFICE
CERTIFICATE OF CORRECTION

PATENT NO. : 6,047,288
DATED : April 4, 2000
INVENTOR(S) : Takahiro Kurosa Wa et al.

It is certified that error appears in the above-identified patent and that said Letters Patent is hereby corrected as shown below:

Item [56] References Cited, OTHER PUBLICATIONS,
"Mechin-" should read -- Machin --.

Sheet 18,
Fig. 21, "Collegue" should read -- Colleague --.

Column 1,
Line 13, "are" should read -- is --.
Line 55, "persons" should read -- person --.

Column 5,
Line 28, "is" should read -- are --.

Column 7,
Line 42, "¶ The" (indent right margin).
Line 43, "of the" should be deleted.

Column 9,
Line 33, "including the" (second occurrence) should be deleted.
Line 62, "carries" should read -- carry --.

Column 10,
Line 8, "is" should read -- are --.

Column 11,
Line 28, "(detailed" shoul read -- (details --.
Line 39, "name of a group" should read -- group name --.

Column 12,
Line 1, "wait" should read -- terminal 10 waits --.
Line 27, "more" should read -- a more --.

Column 13,
Line 33, "designate" should read -- designates --.

Column 15,
Line 3, "operation" should read -- an operation --.
Line 58, "operate" should read -- operates --.

Column 16,
Line 15, "brain storming" should read -- brainstorming --.

UNITED STATES PATENT AND TRADEMARK OFFICE
CERTIFICATE OF CORRECTION

PATENT NO.   : 6,047,288
DATED        : April 4, 2000
INVENTOR(S)  : Takahiro Kurosa Wa et al.

It is certified that error appears in the above-identified patent and that said Letters Patent is hereby corrected as shown below:

Column 18,
Line 40, "private" should read -- private: --.

Column 19,
Line 17, "an" should be deleted.
Line 18, "as similar" should read -- similarly --.

Column 20,
Line 3, "if" should be deleted.

Column 22,
Line 57, "tions" should read -- tion --.

Column 23,
Line 56, "human" should read -- humans --.

Column 24,
Line 10, "users" should read -- user --, and "participate" should read -- participates --.
Line 23, "PDS (Public" should read -- PDS (Public- .
Line 45, "by. "Gr." " should read -- by "Gr", --.
Line 58, "to" (second occurrence) should read -- in --.

Column 25,
Line 1, " "Privacy" " should read -- ¶ "Privacy" --.
Lines 33 and 50, "key board" should read -- keyboard --.
Line 56, "participating" should read -- participating in --.

Column 26,
Line 26, "$150 \approx x \leq 200$," should read -- $150 \leq x \leq 200$, --.
Line 63, "if" should be deleted.

Column 27,
Line 7, "with" should be deleted.
Line 10, "is" (second occurrence) should read -- are --.
Line 43, "is" should read -- are --.

Column 28,
Line 2, "it" should be deleted.
Line 49, "an" should read -- a --.
Line 50, "and more" should read -- . More --.

UNITED STATES PATENT AND TRADEMARK OFFICE
CERTIFICATE OF CORRECTION

PATENT NO. : 6,047,288
DATED : April 4, 2000
INVENTOR(S) : Takahiro Kurosa Wa et al.

It is certified that error appears in the above-identified patent and that said Letters Patent is hereby corrected as shown below:

Column 29,
Line 18, "OS(operating" should read -- OS (operating --.

Column 32,
Line 52, "operation," should read -- operation, and --.

Column 34,
Line 20, "of the" should be deleted.

Signed and Sealed this

Twenty-seventh Day of November, 2001

Attest:

*Attesting Officer*

NICHOLAS P. GODICI
*Acting Director of the United States Patent and Trademark Office*